(12) United States Patent
Sekiya et al.

(10) Patent No.: US 8,994,810 B2
(45) Date of Patent: Mar. 31, 2015

(54) MAGNIFICATION OBSERVATION DEVICE

(75) Inventors: Suguru Sekiya, Osaka (JP); Woobum Kang, Osaka (JP); Masahiro Inomata, Osaka (JP)

(73) Assignee: Keyence Corporation, Osaka (JP)

( * ) Notice: Subject to any disclaimer, the term of this patent is extended or adjusted under 35 U.S.C. 154(b) by 348 days.

(21) Appl. No.: 13/559,799

(22) Filed: Jul. 27, 2012

(65) Prior Publication Data

US 2013/0088586 A1 Apr. 11, 2013

(30) Foreign Application Priority Data

Oct. 7, 2011 (JP) ................. 2011-222575

(51) Int. Cl.
H04N 5/253 (2006.01)
G02B 21/26 (2006.01)
G02B 21/36 (2006.01)

(52) U.S. Cl.
CPC .............. G02B 21/26 (2013.01); G02B 21/365 (2013.01)
USPC ......................................................... 348/79

(58) Field of Classification Search
USPC ............................ 348/79, 80, 222.1; 250/310
See application file for complete search history.

(56) References Cited

U.S. PATENT DOCUMENTS

| | | | |
|---|---|---|---|
| 5,550,635 A * | 8/1996 | Saitoh et al. | 356/401 |
| 5,734,930 A * | 3/1998 | Hagiwara | 396/50 |
| 7,283,299 B2 | 10/2007 | Inomata | |
| 2006/0124850 A1 * | 6/2006 | Matsumoto et al. | 250/310 |
| 2008/0297596 A1 | 12/2008 | Inomata et al. | |
| 2008/0297597 A1 | 12/2008 | Inomata et al. | |
| 2010/0149362 A1 | 6/2010 | Kang | |
| 2010/0149363 A1 | 6/2010 | Inomata et al. | |
| 2010/0149364 A1 | 6/2010 | Kang | |
| 2011/0169936 A1 * | 7/2011 | Naiki | 348/79 |
| 2011/0216183 A1 * | 9/2011 | Yokomachi | 348/79 |
| 2012/0001069 A1 * | 1/2012 | Kashihara | 250/310 |
| 2012/0001070 A1 * | 1/2012 | Takagi | 250/310 |
| 2013/0050464 A1 * | 2/2013 | Kang | 348/79 |
| 2013/0100170 A1 * | 4/2013 | Matsumura et al. | 345/672 |

FOREIGN PATENT DOCUMENTS

| | | |
|---|---|---|
| JP | 2001-059599 | 3/2001 |
| JP | 2004-153462 | 5/2004 |
| JP | 2006-337470 | 12/2006 |
| JP | 2006-337471 | 12/2006 |
| JP | 2008-175893 | 7/2008 |

* cited by examiner

Primary Examiner — Paulos M Natnael
(74) Attorney, Agent, or Firm — Kilyk & Bowersox, P.L.L.C.

(57) ABSTRACT

Provided is a magnification observation device capable of easily moving an observation object in a desired direction even when a stage is rotated, and capable of preventing a desired region of the observation object from going outside an imaging region due to rotation of the stage. The observation object is placed on the placement surface of the stage. The observation object is imaged by an imaging unit, to acquire image data of the imaging region. Based on the image data acquired by the imaging unit, an image of the observation object is displayed by the display part as an observed image. The stage is moved relatively with respect to the imaging unit along an $x_t$-axis and a $y_t$-axis. In this case, moving amounts along the $x_t$-axis and the $y_t$-axis are controlled based on a rotational angle detected by a rotational angle detecting part.

10 Claims, 17 Drawing Sheets

MAGNIFICATION OBSERVATION DEVICE

CROSS-REFERENCE TO RELATED APPLICATIONS

The present application claims foreign priority based on Japanese Patent Application No. 2011-222575, filed Oct. 7, 2011, the contents of which is incorporated herein by reference.

BACKGROUND OF THE INVENTION

1. Field of the Invention

The present invention relates to a magnification observation device.

2. Description of Related Art

Conventionally, there has been used a magnification observation device, provided with a microscope, for observing an observation object. The microscope includes an imaging unit for imaging the observation object. An image of the observation object imaged by the imaging unit is displayed by a display part. A user can acquire detailed information of the observation object based on the image displayed by the display part.

A microscope described in Japanese Unexamined Patent Publication No. 2006-337470 has a camera for measuring an observation object and a stage on which the observation object is placed. The camera is attached to a camera attaching part so as to be along a Z-axis direction (perpendicular direction). The stage is rotatably provided below the camera. The stage is made up of an X-Y stage movable in an X-axis direction and a Y-axis direction. The stage is moved along the X-axis direction and the Y-axis direction, to thereby align the observation object with respect to an imaging region of the camera.

In the above microscope, a rotational axis of the stage is fixed, and an X-axis and a Y-axis of the stage are rotated in association with rotation of the stage. In this case, with the X-axis and the Y-axis of the stage rotating, a moving direction of the stage is difficult to be controlled and the observation object cannot be moved in a desired direction.

On the other hand, there can also be considered a configuration in which the X-axis and the Y-axis of the stage are fixed and the rotational axis of the stage moves in association with movement of the stage in the X-axis direction and the Y-axis direction. However, when the rotational axis of the stage goes outside the imaging region of the camera, a moving amount of the observation object with respect to the imaging region becomes large due to rotation of the stage. Thereby, a desired region of the observation object tends to go outside the imaging region.

SUMMARY OF THE INVENTION

It is an object of the present invention to provide a magnification observation device capable of easily moving an observation object in a desired direction even when a stage is rotated, and capable of preventing a desired region of the observation object from going outside an imaging region due to rotation of the stage.

(1) A magnification observation device according to the present invention includes: an imaging part that images an observation object, to acquire imaging data of an imaging region; a display part that displays an image of the observation object as an observed image based on the image data acquired by the imaging part; a stage that has a placement surface on which the observation object is placed, and is provided relatively rotatably with respect to the imaging part around a rotational axis substantially vertical to the placement surface, and movably along first and second axes intersecting with each other within a plane substantially parallel to the placement surface; a rotational angle detecting part that detects a rotational angle of the stage; a stage driving part that moves the stage relatively with respect to the imaging part along the first and second axes; an instruction accepting part that accepts an instruction for a moving direction of the stage; and a control part that provides the stage driving part with moving amounts of the stage along the first and second axes, to control movement of the stage, wherein the first and second axes of the stage rotate around the rotational axis integrally with the stage, and the control part is configured to control the moving amounts along the first and second axes to be provided to the stage driving part such that a moving direction of the observation object in the imaging region of the imaging part agrees with the direction accepted by the instruction accepting part, based on the rotational angle detected by the rotational angle detecting part.

In the magnification observation device, the stage is provided relatively rotatably with respect to the imaging part around the rotational axis substantially vertical to the placement surface, and movably along the first and second axes intersecting with each other within the plane substantially parallel to the placement surface. The observation object is placed on the placement surface of the stage. The observation object is imaged by the imaging part, to acquire image data of the imaging region. Based on the image data acquired by the imaging part, the image of the observation object is displayed by the display part as an observed image.

When the instruction for the moving direction of the stage is accepted by the instruction accepting part, the moving amounts of the stage along the first and second axes are provided from the control part to the stage driving part. Based on the provided moving amounts, the stage is moved by the stage driving part along the first and second axes, relatively with respect to the imaging part. Accordingly, the observation object moves relatively with respect to the imaging region.

The first and second axes of the stage rotate around the rotational axis integrally with the stage. In this case, the stage can be moved without moving the rotational axis of the stage with respect to the imaging part. For this reason, by arranging the imaging region on the rotational axis of the stage, a desired region of the observation object can be prevented from going outside the imaging region due to rotation of the stage. It is therefore possible to change an orientation of the observation object while imaging the desired area of the imaging object.

When the stage is rotated, the moving amounts along the first and second axes to be provided to the stage driving part are controlled such that the moving direction of the observation object in the imaging region of the imaging part agrees with the direction accepted by the instruction accepting part, based on the rotational angle detected by the rotational angle detecting part. Therefore, even when the stage is rotated, the observation object can be easily moved in a desired direction in the imaging region.

(2) The imaging region of the imaging part may be provided with third and fourth axes intersecting with each other, and the control part may be configured to detect an angle difference between the first and second axes of the stage and the third and fourth axes of the imaging region during predetermined calibration, and the moving amounts of the stage along the first and second axes to be provided to the stage driving part may be corrected based on the detected angle difference in normal time.

In this case, even when the third and fourth axes of the imaging region are displaced from a previously set state, the observation object can be moved with the third and fourth axes of the imaging region taken as references. This allows the user to easily move the observation object in the imaging region while viewing the observation object displayed in the display part, without recognizing the orientation of the imaging part.

(3) The control part may be configured to detect the angle difference between the first and second axes of the stage and the third and fourth axes of the imaging region based on the moving direction of the observed image in a case where the stage has been moved by the stage driving part.

In this case, the angle difference between the first and second axes of the stage and the third and fourth axes of the imaging region can be easily detected, to thereby correct the moving amounts of the stage along the first and second axes by means of the detected angle difference.

(4) A direction specifying part for specifying directions of the first and second axes may be provided on the stage, and the control part may be configured to detect the angle difference between the first and second axes of the stage and the third and fourth axes of the imaging region based on an image of the direction specifying part included in the observed image.

In this case, the angle difference between the first and second axes of the stage and the third and fourth axes of the imaging region can be easily detected, to thereby correct the moving amounts of the stage along the first and second axes by means of the detected angle difference.

(5) The display part may display a position specifying image indicating a position of the imaging region on the stage.

In this case, the user can easily recognize the position of the imaging region on the stage. This allows the user to efficiently align the desired region of the observation object to the imaging region.

(6) The position specifying image may include a first image representing a region wider than the imaging region on the stage and a second image corresponding to the imaging region, and the control part may rotate the first image relatively with respect to the second image based on the rotational angle detected by the rotational angle detecting part.

In this case, the user can easily recognize a positional relation between the stage and the imaging region and a rotational angle of the stage with respect to the imaging region. This allows the user to efficiently align the desired region of the observation object to the imaging region.

(7) The imaging part may be configured to be capable of imaging the region wider than the imaging region, and the display part may display the first image based on image data obtained upon imaging a wide range by the imaging part.

In this case, the user can easily recognize a positional relation between the observation object on the stage and the imaging region. This allows the user to efficiently align the desired region of the observation object to the imaging region.

(8) The first image may show a diagram for specifying the region wider than the imaging region on the stage.

In this case, the first image can be easily displayed in the display part without increasing a process load of the control part.

(9) The first image may correspond to a relatively movable range of the imaging region on the stage.

In this case, the user can easily recognize a relative movable range of the imaging region on the stage. This allows the user to efficiently align the desired region of the observation object to the imaging region.

(10) The instruction accepting part may be configured to be capable of accepting designation of an arbitrary position in the position specifying image, and the control part may control movement of the stage by the stage driving part such that the imaging region moves to a position on the stage which corresponds to the position designated by the instruction accepting part.

In this case, the user designates a desired position on the position specifying image, and thus the stage moves such that the position on the stage which corresponds to the designated position becomes the imaging region. This allows the user to efficiently align the desired region of the observation object to the imaging region.

(11) The control part may be configured to detect a moving amount of the observed image in the case where the stage has been moved, calculate a relation between the moving amount of the observed image and the moving amount of the stage based on the detected moving amount, and correct the moving amount to be provided to the stage driving part based on the calculated relation.

In this case, occurrence of an error in the relation between the moving amount of the observed image and the moving amount of the stage is prevented. This allows accurate control of movement of the stage based on the observed image.

According to the present invention, it is possible to easily move an observation object in a desired direction even when the stage is rotated, and also prevent a desired region of the observation object from going outside an imaging region due to rotation of the stage.

DETAILED DESCRIPTION OF PREFERRED EMBODIMENTS

Hereinafter, a magnification observation device according to one embodiment of the present invention will be described with reference to the drawings.

(1) Configuration of Magnification Observation Device

Figure 1:
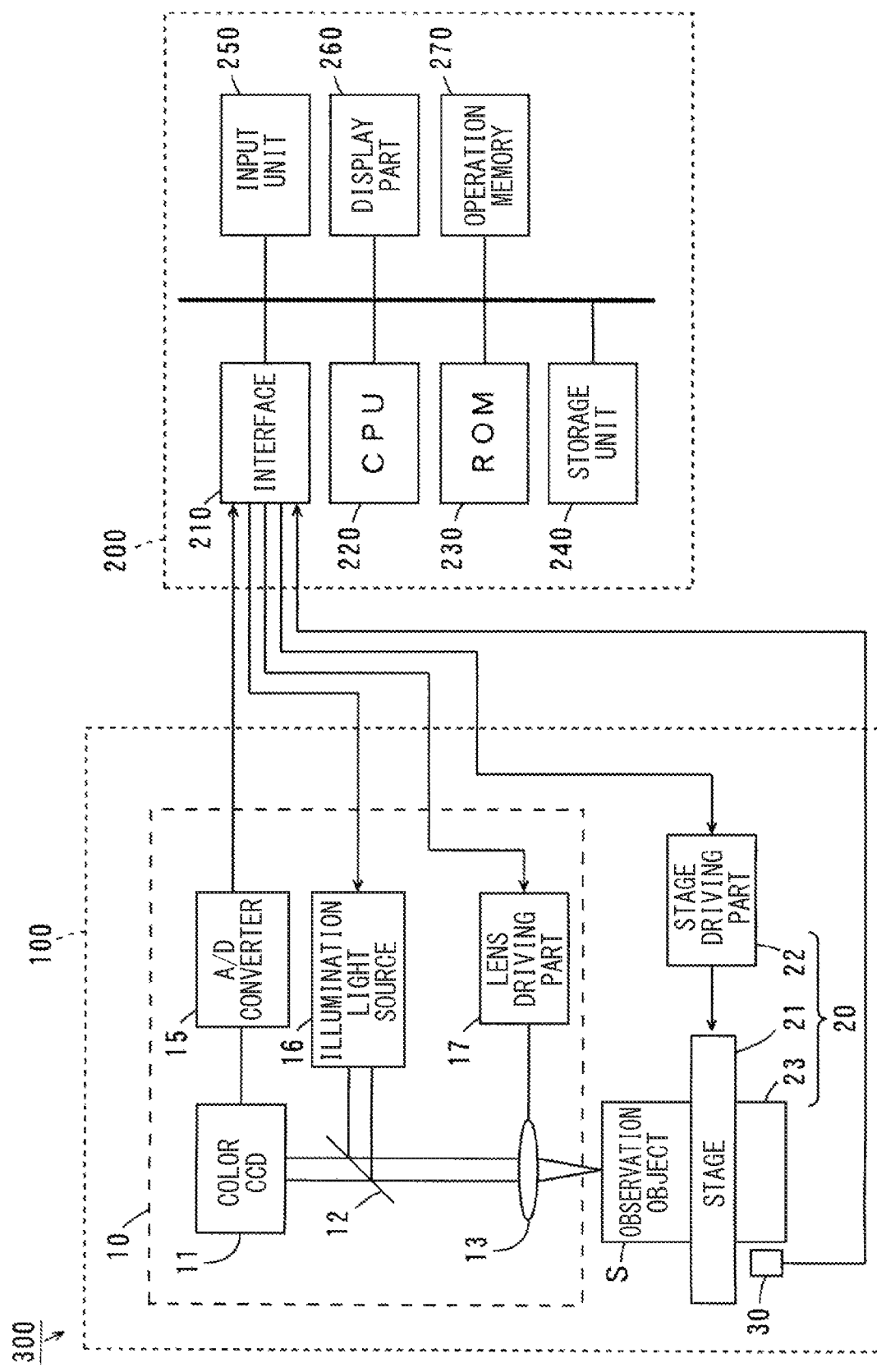
FIG. 1 is a block diagram showing a configuration of a magnification observation device according to one embodiment of the present invention.

FIG. 1 is a block diagram showing a configuration of a magnification observation device according to one embodiment of the present invention. As shown in FIG. 1, a magnification observation device 300 is provided with a microscope 100 and an image processing apparatus 200.

The microscope 100 includes an imaging unit 10, a stage unit 20, and a rotational angle sensor 30. The imaging unit 10 includes a color CCD (charge coupled device) 11, a half mirror 12, an object lens 13, an A/D converter (analog/digital converter) 15, an illumination light source 16, and a lens driving part 17. The stage unit 20 includes a stage 21, a stage driving part 22, and a stage supporting part 23. An observation object S is placed on the stage 21.

In the microscope 100, an X-axis and a Y-axis intersecting with each other within a horizontal plane, and a Z-axis (perpendicular direction) vertical to the X-axis and the Y-axis are defined. In the following description, a direction parallel to the X-axis is referred to as an X-axis direction, a direction parallel to the Y-axis is referred to as a Y-axis direction, and a direction parallel to the Z-axis is referred to as a Z-axis direction.

The illumination light source 16 is, for example, a halogen lamp or a white light LED (light-emitting diode) which generates white light. White light generated by the illumination light source 16 is reflected by the half mirror 12, and thereafter collected by the object lens 13 onto the observation object S on the stage 21.

The white light reflected by the observation object S is transmitted through the object lens 13 and the half mirror 12, and incident on the color CCD 11. The color CCD 11 has a plurality of pixels for red that receive red wavelength light, a plurality of pixels for green that receive green wavelength light, and a plurality of pixels for blue that receive blue wavelength light. The plurality of pixels for red, the plurality of pixels for green, and the plurality of pixels for blue are two-dimensionally arrayed. From each of the pixels in the color CCD 11, an electric signal corresponding to a light receiving amount is outputted. The output signal of the color CCD 11 is converted to a digital signal by the A/D converter 15. The digital signal outputted from the A/D converter 15 is sequentially provided as image data to the image processing apparatus 200. Instead of the color CCD 11, an imaging element such as a CMOS (complementary metal oxide semiconductor) image sensor may be used.

The object lens 13 is, for example, a zoom lens, and is configured such that its magnification is manually or automatically changeable. The magnification of the object lens 13 is detected by a magnification detecting part (not shown). Further, the object lens 13 is provided movably in the Z-axis direction. The lens driving part 17 moves the object lens 13 in the Z-axis direction by control of the image processing apparatus 200. Thereby, a position of a focus of the imaging unit 10 is moved in the Z-axis direction.

The stage 21 is rotatably provided on the stage supporting part 23 around a rotational axis parallel to the Z-axis. The stage driving part 22 moves the stage 21 along a later-mentioned x-axis and y-axis relatively with respect to the imaging unit 10 based on a movement command signal (drive pulse) provided from the image processing apparatus 200. Further, the stage driving part 22 rotates the stage 21 around the rotational axis parallel to the Z-axis relatively with respect to the imaging unit 10 based on the rotation command signal (drive pulse) provided from the image processing apparatus 200. A position of the rotational axis of the stage 21 is constant with respect to the stage supporting part 23. The stage driving part 22 uses a stepping motor. The rotational angle sensor 30 detects a rotational angle of the stage 21, and provides the image processing apparatus 200 with an angle detection signal indicating the detected angle.

The image processing apparatus 200 includes an interface 210, a CPU (central processing unit) 220, a ROM (read only memory) 230, a storage unit 240, an input unit 250, a display part 260, and an operation memory 270.

A system program is stored into the ROM 230. The storage unit 240 is made up of a hard disk and the like. In the storage unit 240, a variety of control programs and programs are stored, and a variety of data, such as image data provided from the microscope 100 through the interface 210, are also stored. The input unit 250 includes a keyboard and a pointing device, and is configured to be able to accept a movement instruction and a rotation instruction for the stage 21 from the user or an external device. In the present embodiment, the movement instruction includes a moving direction and a moving amount, and the rotation instruction includes a rotational direction and a rotational angle. As the pointing device, a mouse, a joystick, or the like is used.

The display part 260 is configured, for example, by a liquid crystal display panel or an organic EL (electroluminescent) panel. As described later, the display part 260 is set with an $x_d$-axis and a $y_d$-axis intersecting with each other. The $x_d$-axis corresponds to a lateral direction of the screen of the display part 260, and the $y_d$-axis corresponds to a vertical direction of the screen of the display part 260.

The operation memory 270 is made up of a RAM (random access memory), and used for processing a variety of data. The CPU 220 executes the control programs stored in the storage unit 240, to perform a variety of processes by means of the operation memory 270, and displays an image based on the image data in the display part 260. Further, the CPU 220 controls the color CCD 11, the illumination light source 16, the lens driving part 17, and the stage driving part 22 of the microscope 100 through the interface 210.

Figure 2:
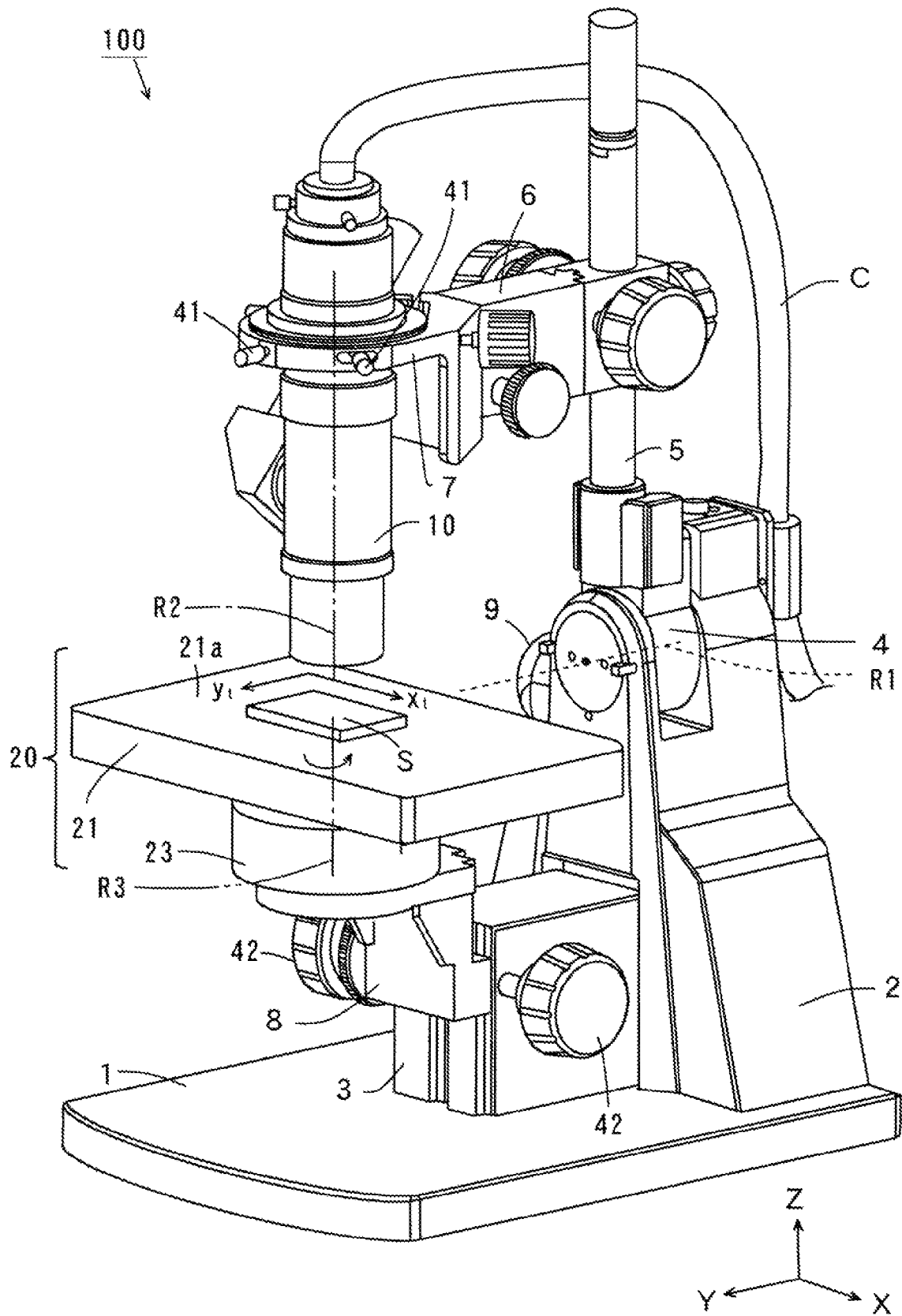
FIG. 2 is a perspective view showing a microscope of the magnification observation device according to one embodiment of the present invention.

FIG. 2 is a perspective view showing the microscope 100 of the magnification observation device 300 according to one embodiment of the present invention. In FIG. 2, the X-axis, the Y-axis, and the Z-axis are indicated by arrows.

As shown in FIG. 2, the microscope 100 has a base 1. A first supporting base 2 is attached onto the base 1, and a second supporting base 3 is also attached to the front surface of the first supporting base 2 so as to be embedded thereinto.

A connecting part 4 is rotatably attached to the top edge of the first supporting base 2 around a rotational axis R1 extending in the Y-axis direction. A rotational column 5 is attached to the connecting part 4. Thereby, the rotational column 5 is inclinable within a vertical plane parallel to the Z-axis with the rotational axis R1 taken as a fulcrum point in association with rotation of the connecting part 4. The user can fix the connecting part 4 to the first supporting base 2 by means of a fixing knob 9.

A circular supporting part 7 is attached to the front surface of a connecting part 6. A substantially tubular imaging unit 10 is attached to the supporting part 7. In the state of FIG. 2, a light axis R2 of the imaging unit 10 is parallel to the Z-axis. The supporting part 7 has a plurality of adjustment screws 41 for moving the imaging unit 10 within a horizontal plane. It is possible to adjust a position of the imaging unit 10 such that the light axis R2 of the imaging unit 10 vertically intersects with a rotational axis R1 by means of the plurality of adjustment screws 41.

A slider 8 is attached, slidably in the Z-axis direction, to the front surface of the second supporting base 3 on the base 1. An adjustment knob 42 is provided on the side surface of the second supporting base 3. A position of the slider 8 in the Z-axis direction (height direction) is adjustable by the adjustment knob 42.

The supporting part 23 of the stage unit 20 is attached onto the slider 8. The stage 21 is rotationally provided around a rotational axis R3 parallel to the Z-axis with respect to the supporting part 23. The stage 21 has a placement surface 21a on which an observation object S is placed. Further, an $x_t$-axis and a $y_t$-axis intersecting with each other within the horizontal plane are set on the stage 21. The stage 21 is provided movably along the $x_t$-axis and the $y_t$-axis by the stage driving part 22 of FIG. 1. When the stage 21 rotates around the rotational axis R3, the $x_t$-axis and the $y_t$-axis of the stage 21 also rotate. Thereby, the $x_t$-axis and the $y_t$-axis of the stage 21 are inclined with respect to the X-axis and the Y-axis within a horizontal plane.

An imaging range (visual field range) of the imaging unit 10 on the placement surface 21a of the stage 21 varies depending on a magnification of the imaging unit 10 (magnification of the object lens 13). Hereinafter, the imaging range of the imaging unit 10 is referred to as an imaging region, and as described later, an $x_r$-axis and a $y_r$-axis intersecting with each other are set in the imaging region. The $x_r$-axis and the $y_r$-axis of the imaging region respectively correspond to the $x_d$-axis and the $y_d$-axis of the display part 260.

Based on image data of the imaging region, an image of the observation object S is displayed in the display part 260 of FIG. 1. Hereinafter, the image of the observation object S displayed in the display part 260 is referred to as an observed image. As described later, the observed image is set with an $x_i$-axis and a $y_i$-axis intersecting with each other. The $x_i$-axis and the $y_i$-axis of the observed image respectively correspond to the $x_t$-axis and the $y_t$-axis of the stage 21.

Figure 3:
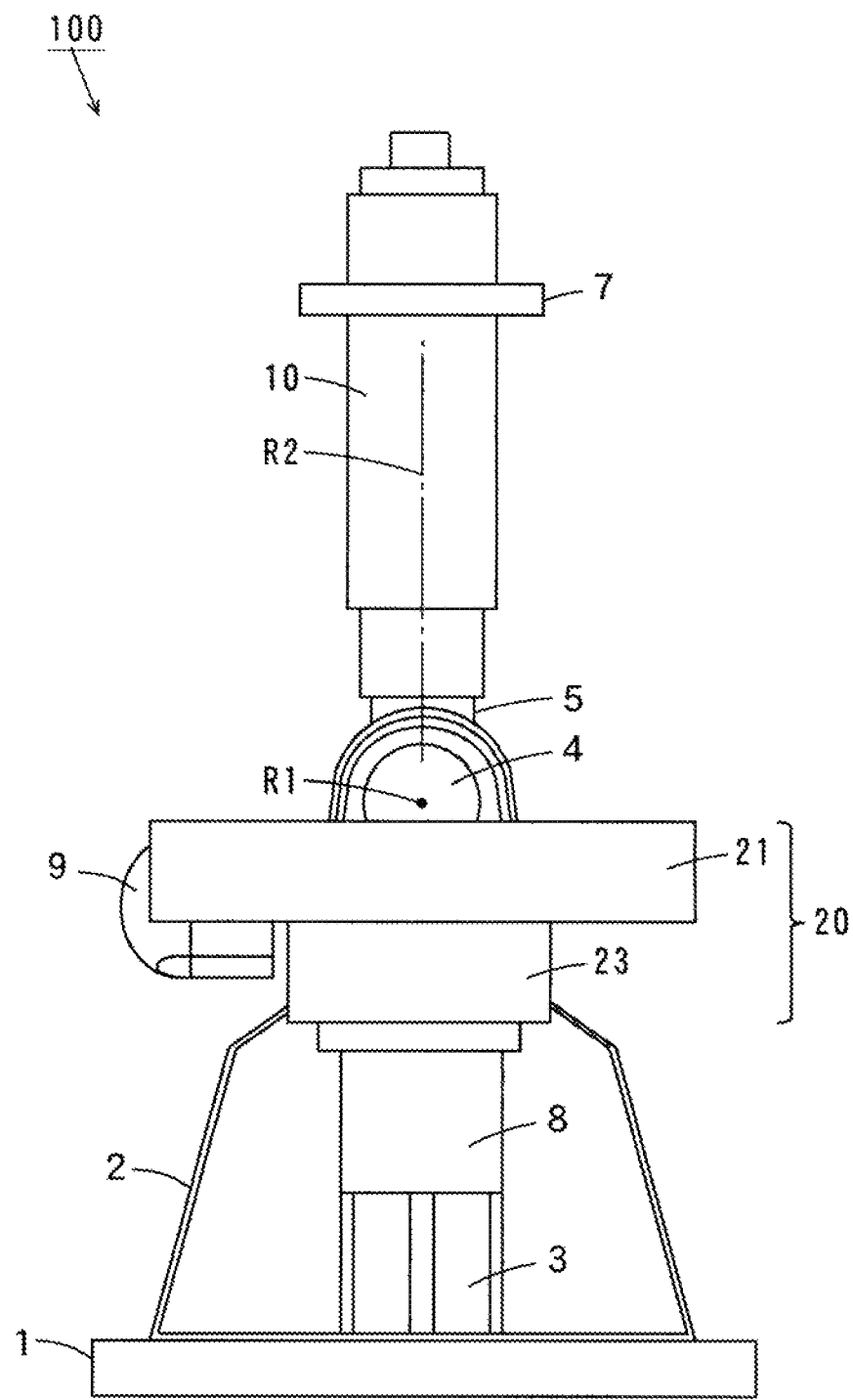
FIG. 3 is a schematic view showing a state where an imaging unit of the microscope is fixed parallel to a Z-axis.
Figure 4:
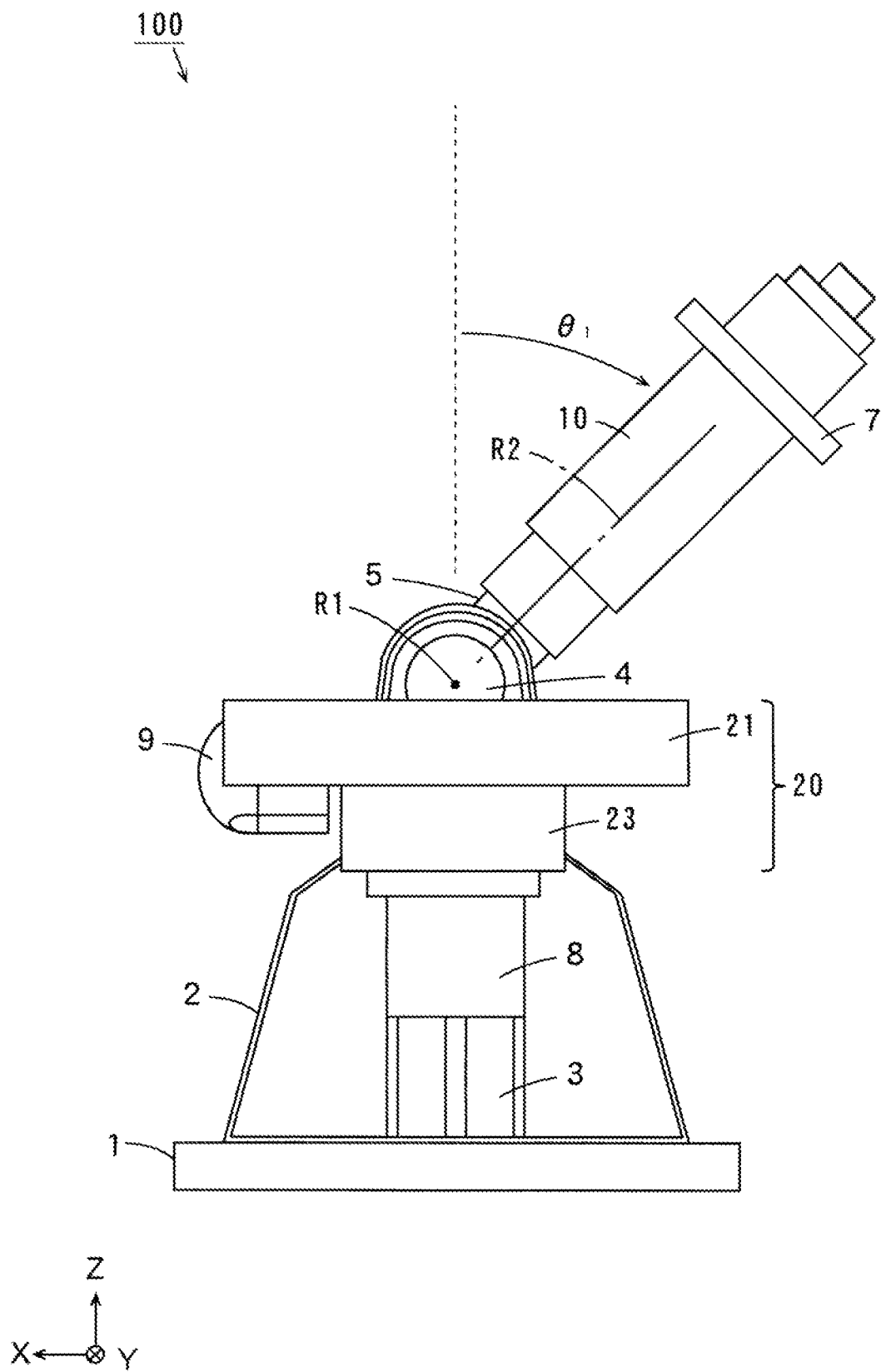
FIG. 4 is a schematic view showing a state where the imaging unit of the microscope is inclined at a desired angle from the Z-axis.

FIG. 3 is a schematic view showing a state where the imaging unit 10 of the microscope 100 is fixed parallel to the Z-axis. Further, FIG. 4 is a schematic view showing a state where the imaging unit 10 of the microscope 100 is inclined at a desired angle with respect to the Z-axis.

As shown in FIG. 3, with the rotational column 5 in a parallel state to the Z-axis, the fixing knob 9 is fastened, to fix the connecting part 4 to the second supporting base 3. Thereby, the light axis R2 of the imaging unit 10 vertically intersects with the rotational axis R1 while being in a parallel state to the Z-axis. In this case, the light axis R2 of the imaging unit 10 is vertical to the surface of the stage 21.

The fixing knob 9 is loosened, to make the connecting part 4 rotatable around the rotational axis R1, and the rotational column 5 inclinable with the rotational axis R1 taken as a fulcrum point. Therefore, as shown in FIG. 4, the light axis R2 of the imaging unit 10 is inclinable at an arbitrary angle θ1 with respect to the Z-axis. In this case, the light axis R2 of the imaging unit 10 vertically intersects with the rotational axis R1. Similarly, the light axis R2 of the imaging unit 10 is inclinable at an arbitrary angle on the side opposite to the side in FIG. 4 with respect to the Z-axis.

Therefore, a height of the surface of the observation object S on the stage 21 can be made to agree with a height of the rotational axis R1, to thereby observe the same portion of the observation object in a vertical direction and an oblique direction.

(2) Operation of Stage Unit

Upon provision of a movement instruction for the stage 21 or a rotation instruction for the stage 21 from the user or the external device to the input unit 250 of the image processing apparatus 200 (FIG. 1), the CPU 220 provides a movement command signal or a rotation command signal to the stage driving part 22. The stage driving part 22 moves the stage 21 along the $x_t$-axis and the $y_t$-axis based on the movement command signal from the CPU 220, or rotates the stage 21 around the rotational axis R3 based on the rotation command signal from the CPU 220.

In the present embodiment, the movement command signal from the CPU 220 includes a moving amount of the stage 21 along the $x_t$-axis (hereinafter, referred to as $x_t$ moving amount), and a moving amount of the stage 21 along the $y_t$-axis (hereinafter, referred to as $y_t$ moving amount). The rotation command signal from the CPU 220 includes a rotational direction and a rotational angle of the stage 21.

Herein, as described above, when the stage 21 rotates around the rotational axis R3, the $x_t$-axis and the $y_t$-axis of the stage 21 are inclined with respect to the X-axis and the Y-axis. For this reason, in order to move the stage 21 in a moving direction provided as a movement instruction, it is necessary to control of the $x_t$ moving amount and the $y_t$ moving amount in accordance with the rotational angle of the stage 21. In the present embodiment, based on the rotational angle of the stage 21 detected by the rotational angle sensor 30, the $x_t$ moving amount and the $y_t$ moving amount are calculated such that the moving direction provided as the movement instruction agrees with an actual moving direction of the stage 21.

Figure 5A:
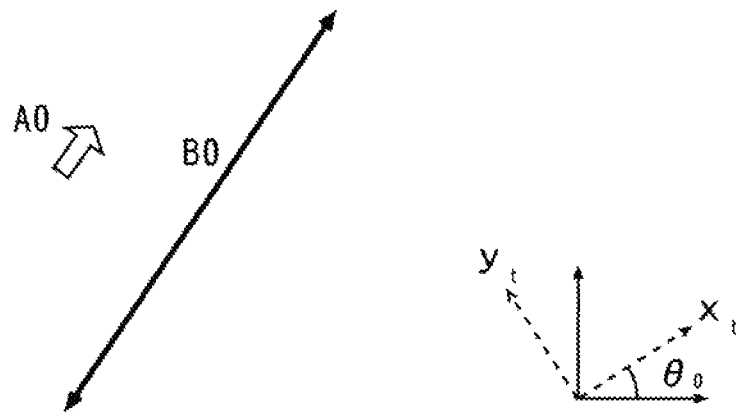
FIGS. 5A to 5C are schematic views showing an example of a method for calculating an $x_t$ moving amount and a $y_t$ moving amount.
Figure 5B:
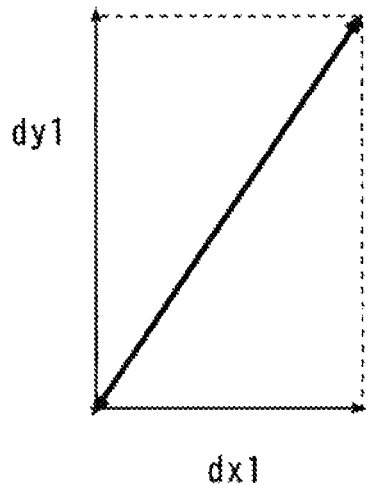
Figure 5C:
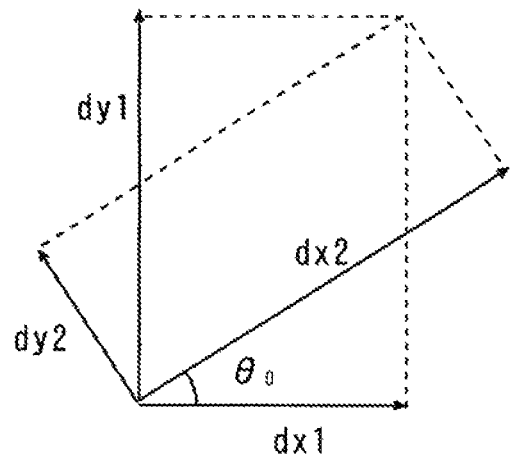

FIGS. 5A to 5C are schematic views showing an example of a method for calculating an $x_t$ moving amount and a $y_t$ moving amount. In the example of FIGS. 5A to 5C, the $x_t$-axis and the $y_t$-axis are inclined at an angle θ₀ with respect to the X-axis and the Y-axis. As shown in FIG. 5A, the input unit 250 is provided with a moving direction A0 and a moving amount B0 as a movement instruction. In this case, as shown in FIG. 5B, a moving amount dx1 along the X-axis and a moving amount dy1 along the Y-axis are calculated based on the moving direction A0 and the moving amount B0. Further, as shown in FIG. 5C, an $x_t$ moving amount dx2 and a $y_t$ moving amount dy2 are calculated based on the calculated moving amounts dx1, dy1 and the rotational angle θ₀ of the stage 21 detected by the rotational angle sensor 30.

Figure 6:
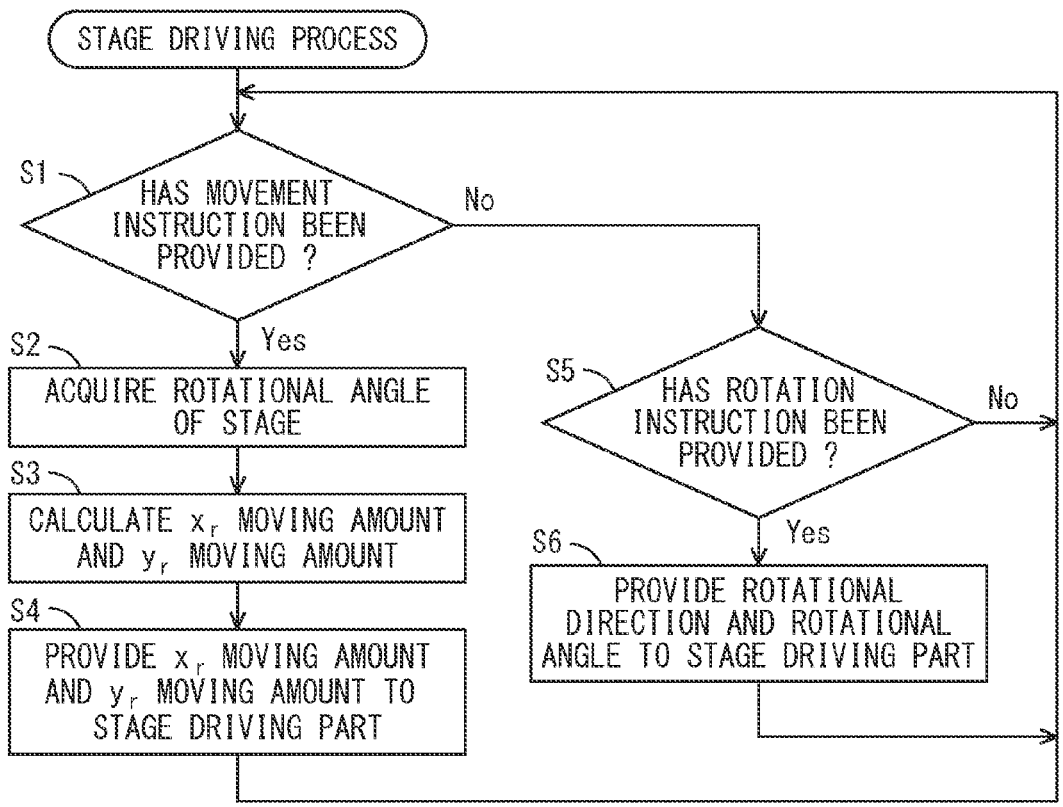
FIG. 6 is a flowchart for a stage driving process by a CPU.

FIG. 6 is a flowchart for a stage driving process by the CPU 220. The CPU 220 performs the stage driving process of FIG. 6 based on the control program stored in the storage unit 240.

As shown in FIG. 6, first, the CPU 220 determines whether or not a movement instruction of the stage 21 has been provided to the input unit 250 (step S1). When the movement instruction of the stage 21 has been provided, the CPU 220 acquires a rotational angle of the stage 21 based on an angle detection signal from the rotational angle sensor 30 (step S2). Next, the CPU 220 calculates an $x_t$ moving amount and a $y_t$ moving amount as described above based on the provided movement instruction and the acquired rotational angle (step S3). Subsequently, the CPU 220 provides the calculated $x_t$ moving amount and $y_t$ moving amount as a movement command signal to the stage driving part 22 (step S4). Thereafter, the CPU 220 returns to the process of step S1.

In step S1, when the movement instruction of the stage 21 has not been provided, the CPU 220 determines whether or not a rotation instruction of the stage 21 has been provided to the input unit 250 (step S5). When the rotation instruction of the stage 21 has not been provided, the CPU 220 returns to the process of step S1. When the rotation instruction of the stage 21 has been provided, the CPU 220 provides a rotational direction and a rotational angle as a rotation command signal to the stage driving part 22 based on the provided rotation instruction (step S6). Thereafter, the CPU 220 returns to the process of step S1.

As described above, the $x_t$ moving amount and the $y_t$ moving amount are calculated based on the movement instruction provided to the input unit 250 and the rotational angle detected by the rotational angle sensor 30, and the calculated $x_t$ moving amount and the $y_t$ moving amount are provided to the stage driving part 22. Based on the $x_t$ moving amount and the $y_t$ moving amount, the stage 21 is moved from the stage driving part 22 along the $x_t$-axis and the $y_t$-axis. Therefore, even when the stage 21 is rotated, the observation object S can be moved in a desired direction in the imaging region.

It is to be noted that the rotational angle of the stage 21, detected by the rotational angle sensor 30, may be displayed by the display part 260. In this case, the user can easily recognize the rotational angle of the stage 21.

Although the moving amount and the moving direction are provided as the movement instruction in the present example, this is not restrictive. For example, a coordinate (hereinafter, referred to as target coordinate) showing a position to which a movement is made may be provided as a movement instruction. For example, there are set an XY coordinate system with the X-axis and the Y-axis taken as coordinate axes, and an $x_t y_t$ coordinate system with the $x_t$-axis and the $y_t$-axis taken as coordinate axes. In this case, a target coordinate in the XY coordinate system is provided as a movement instruction. The provided target coordinate is converted to a coordinate in the $x_t y_t$ coordinate system based on the rotational angle of the stage 21. Based on the converted target coordinate, an $x_t$ moving amount and a $y_t$ moving amount can be calculated.

Further, even when a moving amount and a moving direction are provided as a movement instruction, an $x_t$ moving amount and a $y_t$ moving amount may be calculated using the XY coordinate system and the $x_t y_t$ coordinate system in a similar manner to the above. For example, a target coordinate in the XY coordinate system is calculated based on the provided moving amount and the moving direction. The calculated target coordinate is converted to a coordinate in the $x_t y_t$ coordinate system based on a rotational angle of the stage 21. Based on the converted target coordinate, an $x_t$ moving amount and a $y_t$ moving amount can be calculated.

(3) Relation Between Operation of Stage Unit and Observed Image

Figure 7:
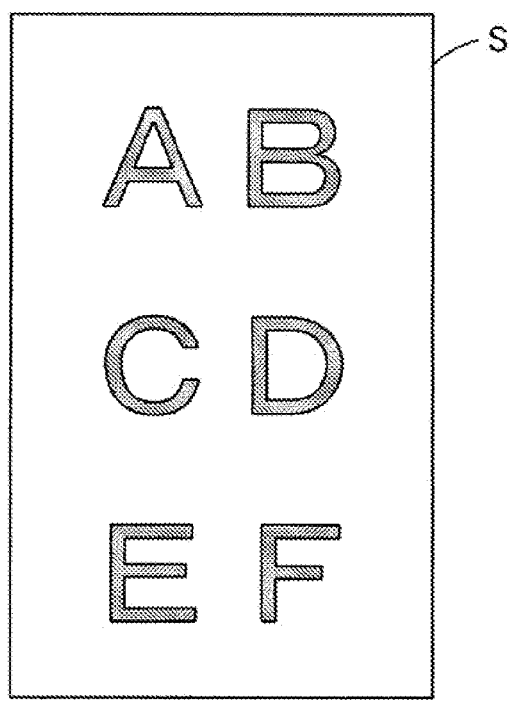
FIG. 7 is a plan view showing an example of an observation object placed on a placement surface of the stage.
Figure 8A:
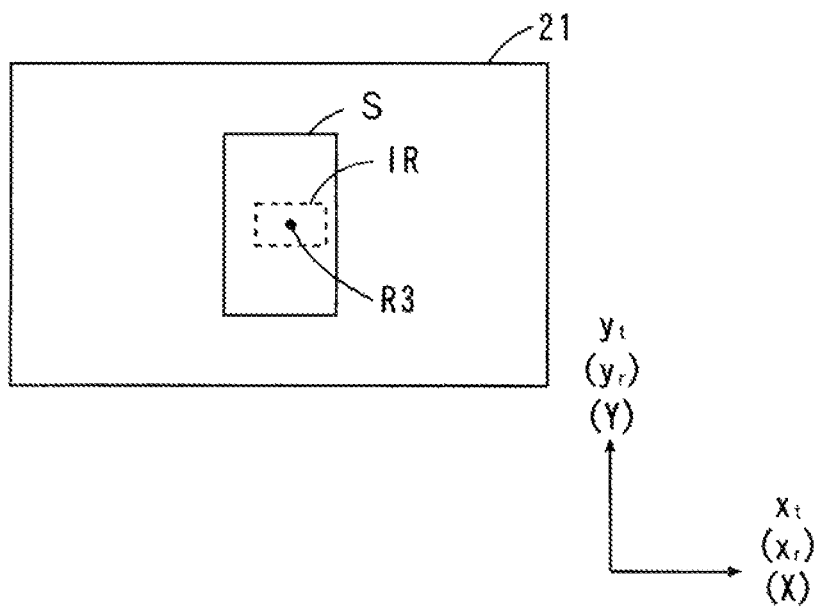
FIGS. 8A and 8B are views showing a relation between an operation of a stage unit and an observed image displayed in a display part.
Figure 8B:
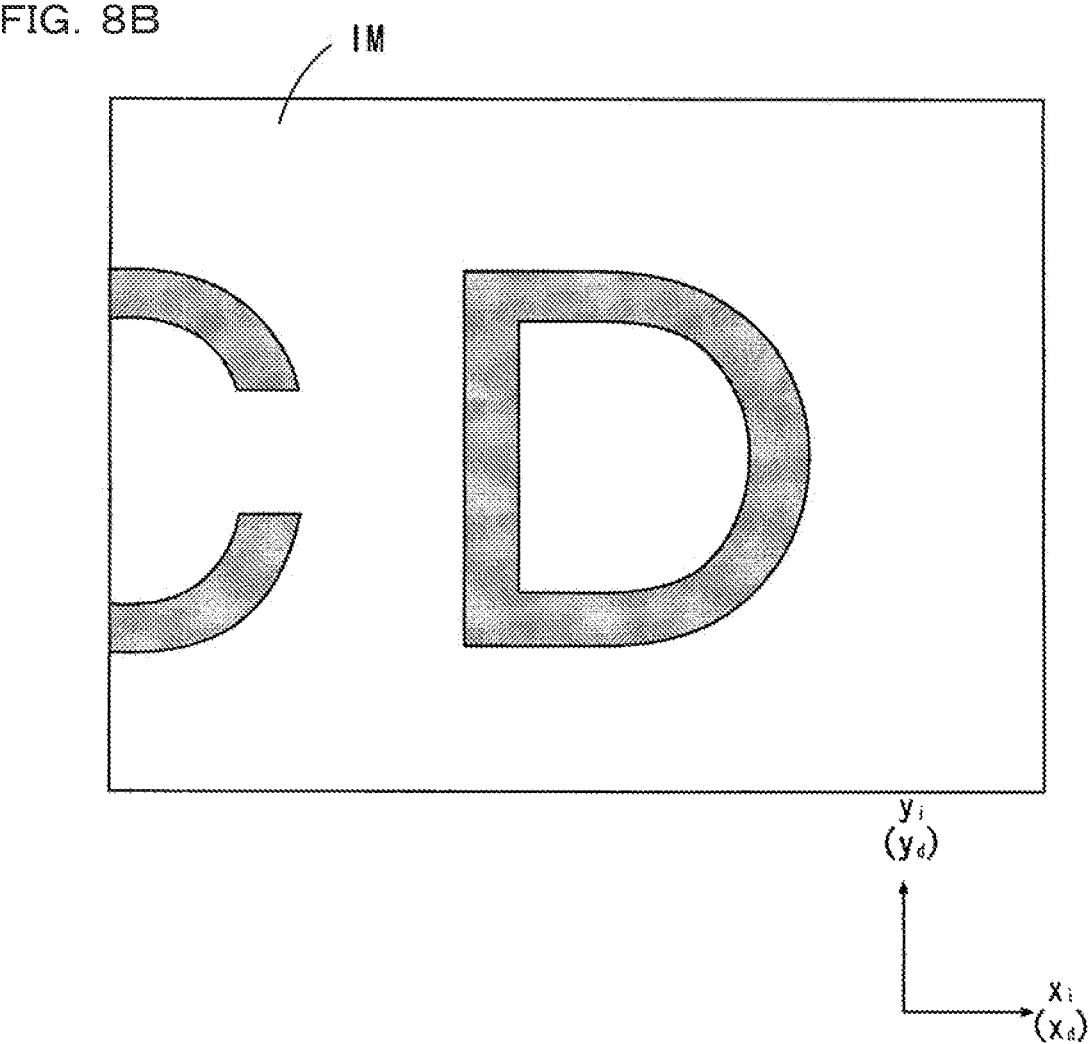
Figure 9A:
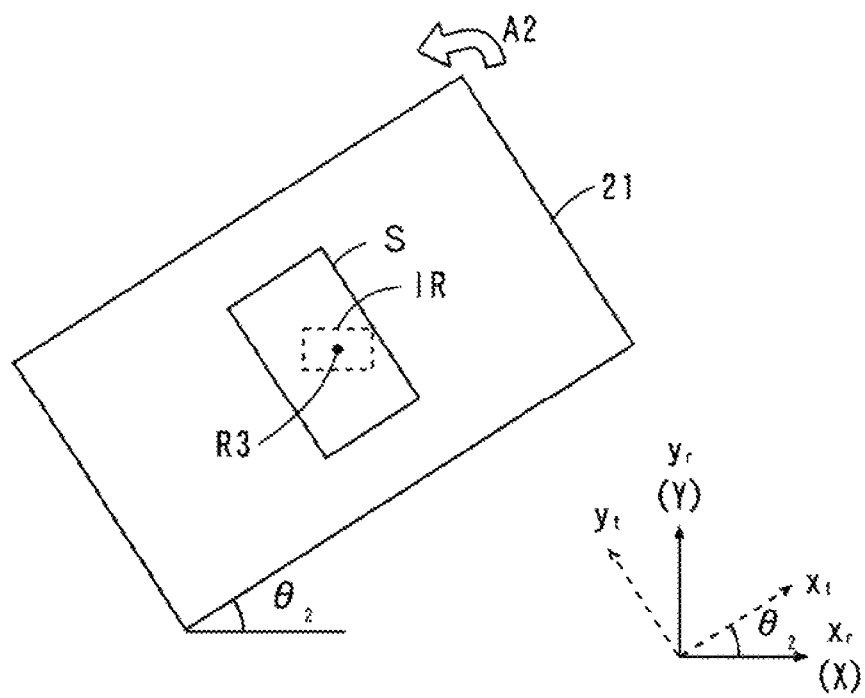
FIGS. 9A and 9B are views showing a relation between an operation of the stage unit and an observed image displayed in the display part.
Figure 9B:
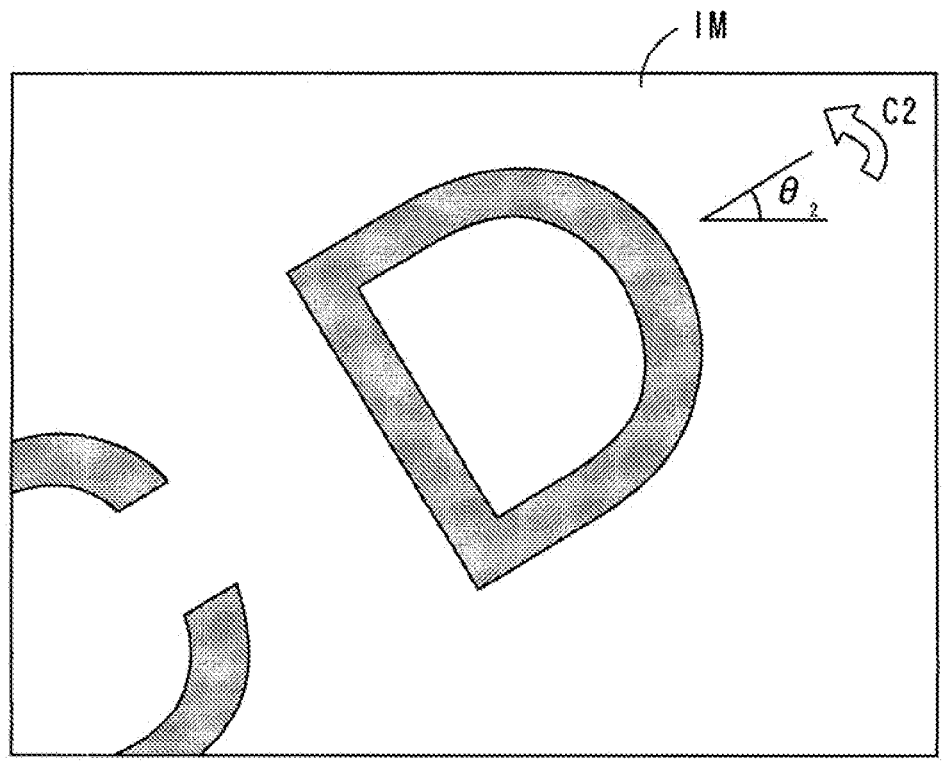
Figure 10A:
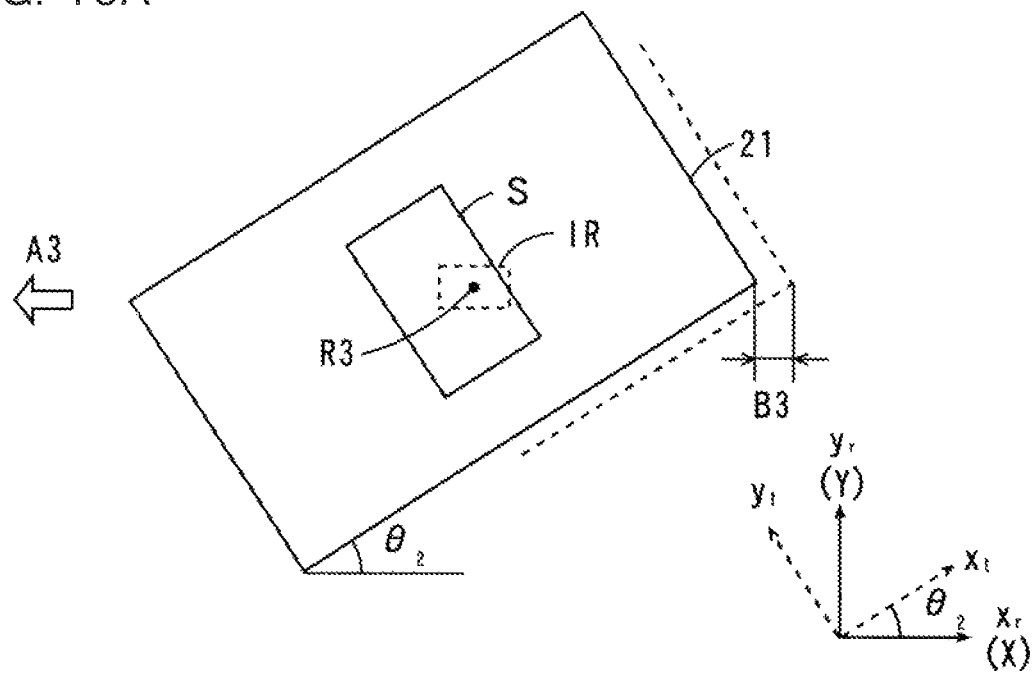
FIGS. 10A and 10B are views showing a relation between an operation of the stage unit and an observed image displayed in the display part.
Figure 10B:
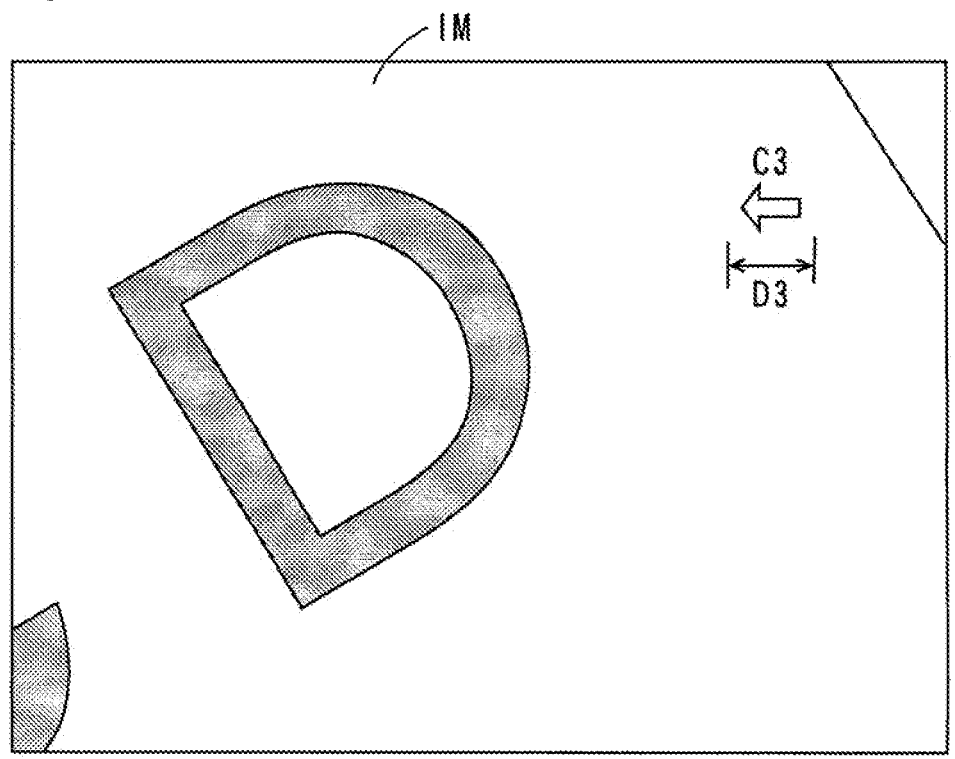

Hereinafter, a relation between an operation of the stage unit 20 and an observed image displayed in the display part 260 will be described. FIG. 7 is a plan view showing an example of the observation object S placed on the placement surface 21a of the stage 21. FIGS. 8A to 10B are views each showing a relation between an operation of the stage unit 20 and an observed image displayed in the display part 260. FIGS. 8A, 9A, and 10A each show a positional relation between the stage 21 and the imaging region, and FIGS. 8B, 9B, and 10B each show an observed image displayed in the display part 260. Further, FIGS. 8A, 9A, and 10A each show the X-axis and the Y-axis, the $x_t$-axis and the $y_t$-axis of the stage 21, and the $x_r$-axis and the $y_r$-axis of the imaging region. FIGS. 8B, 9B, and 10B each show the $x_d$-axis and the $y_d$-axis of the display part 260 and the xi-axis and the $y_i$-axis of the observed image.

In the following description, a direction An (n is a natural number) is a direction of movement or rotation of the stage 21, and a direction Cn is a direction of movement or rotation of an observed image IM. The direction An which is relative with respect to the X-axis and the Y-axis agrees with the direction Cn which is relative with respect to the $x_d$-axis and the $y_d$-axis of the display part 260. Further, a moving amount Bn is a moving amount of the stage 21, and a moving amount Dn is a moving amount of the observed image. In the present example, a ratio between the moving amount Bn and the moving amount Dn is constant.

In the state of FIG. 8A, the $x_t$-axis and the $y_t$-axis of the stage 21 respectively agree with the X-axis and the Y-axis. Further, the $x_r$-axis and the $y_r$-axis of an imaging region IR respectively agree with the X-axis and the Y-axis. In this case, as shown in FIG. 8B, the $x_i$-axis and the $y_i$-axis of the observed image IM respectively agree with the $x_d$-axis and the $y_d$-axis of the display part 260.

As shown in FIG. 9A, when a rotational direction A2 and a rotational angle θ2 are provided as a rotation instruction to the input unit 250, the stage 21 is rotated just by the angle θ2 in the direction A2 around the rotational axis R3. In this case, as shown in FIG. 9B, the observed image IM rotates just by the angle θ2 in a rotational direction C2.

It is to be noted that, in the present example, the position of the imaging unit 10 is adjusted such that the rotational axis R3 is located at the central part of the imaging region IR. Hence, even when the stage 21 is rotated around the rotational axis R3, a desired region of the observation object S is prevented from going outside the imaging region IR. It is thus possible to rotate the observation object S while imaging the desired region of the observation object S by the imaging unit 10.

Especially, as in the example of FIG. 4, when the stage 21 is rotated with the imaging unit 10 in an inclined state with respect to the Z-axis, the desired region of the observation object S is imaged from a variety of angles. This allows the user to stereoscopically observe the desired region of the observation object S.

Further, although the position of the rotational axis R3 of the stage 21 is fixed with respect to the stage supporting part 23 in the present example, this is not restrictive. The position of the rotational axis R3 of the stage 21 may be changeable with respect to the stage supporting part 23. In this case, the position of the rotational axis R3 of the stage 21 can be adjusted such that the rotational axis R3 is located at the central part of the imaging region IR.

As shown in FIG. 10A, when a moving direction A3 and a moving amount B3 are provided as a movement instruction to the input unit 250, the stage 21 moves just by the moving amount B3 in the moving direction A3. In this case, as described above, an $x_t$ moving amount and a $y_t$ moving amount are calculated based on the moving direction A3, the moving amount B3, and the angle θ2, and the stage 21 is moved based on the $x_t$ moving amount and the $y_t$ moving amount. As shown in FIG. 10B, the observed image IM moves just by a moving amount D3 in a direction C3.

(4) Displacement of Imaging Unit

In the examples of FIGS. 8 and 9, since the $x_r$-axis and the $y_r$-axis of the imaging region IR respectively agree with the X-axis and the Y-axis, the moving direction of the stage 21 with respect to the X-axis and the Y-axis agrees with the moving direction of the observed image IM with respect to the $x_d$-axis and the $y_d$-axis of the display part 260. In practice, there are cases where the $x_r$-axis and the $y_r$-axis of the imaging region IR are displaced with respect to the X-axis and the Y-axis due to an assembly error or the like. Further, when the imaging unit 10 is provided detachably from the supporting part 7, the imaging unit 10 may be attached to the supporting part 7 with the $x_r$-axis and the $y_r$-axis of the imaging region IR in a displaced state with respect to the X-axis and the Y-axis. When the $x_r$-axis and the $y_r$-axis of the imaging region IR are displaced with respect to the X-axis and the Y-axis, the following problem occurs.

FIGS. 11A, 11B, 12A, and 12B are views each showing a relation between an operation of the stage unit 20 and an observed image displayed in the display part 260 in the case where the $x_r$-axis and the $y_r$-axis of the imaging region IR are displaced with respect to the X-axis and the Y-axis.

Figure 11A:
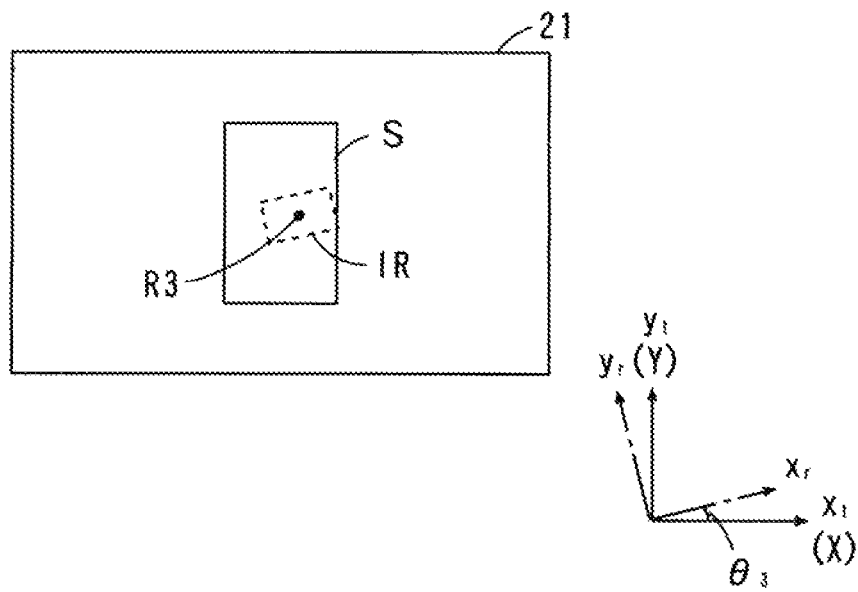
FIGS. 11A and 11B are views showing a relation between an operation of the stage unit and an observed image displayed in the display part.
Figure 11B:
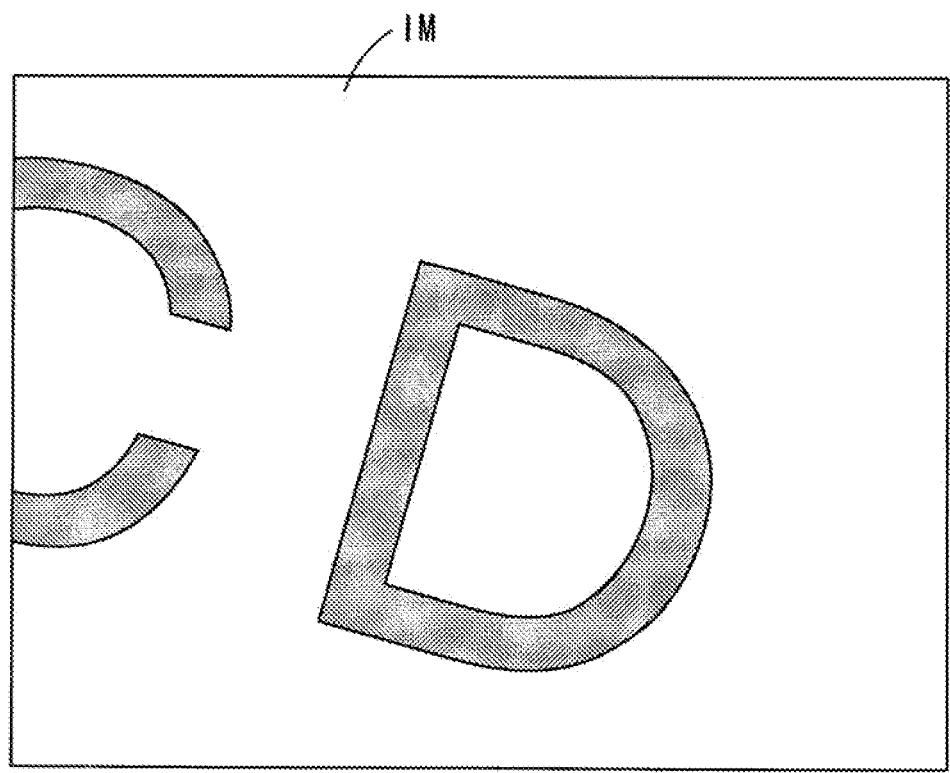

In the state of FIG. 11A, the $x_t$-axis and the $y_t$-axis of the stage 21 respectively agree with the X-axis and the Y-axis, and the $x_r$-axis and the $y_r$-axis of the imaging region IR are respectively inclined just by an angle θ3 with respect to the X-axis and the Y-axis. In this case, as shown in FIG. 11B, the $x_r$-axis and the $y_r$-axis of the observed image IM are respectively inclined just by the angle θ3 with respect to the $x_d$-axis and the $y_d$-axis of the display part 260.

Figure 12A:
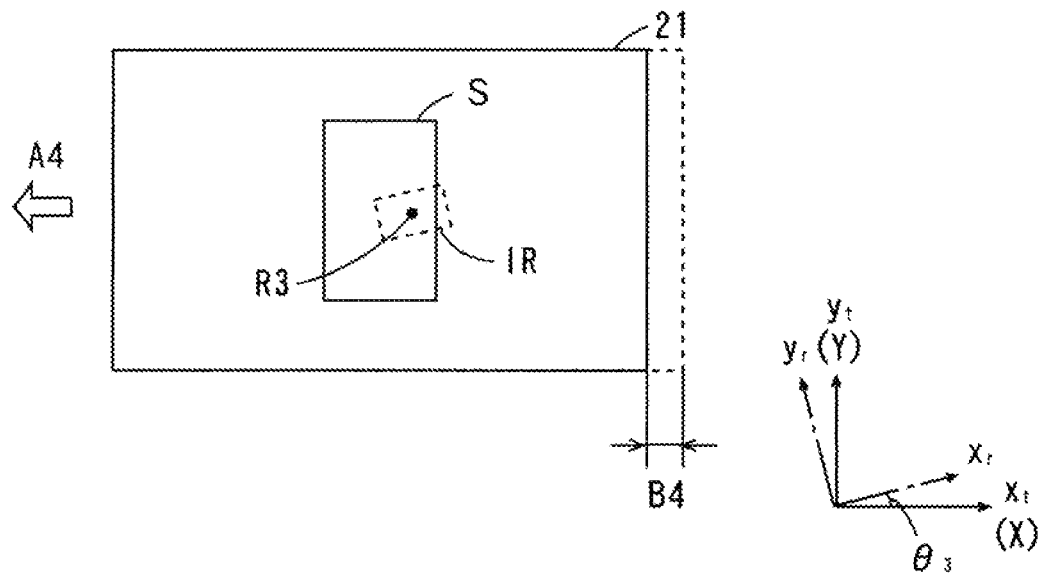
FIGS. 12A and 12B are views showing a relation between an operation of the stage unit and an observed image displayed in the display part.
Figure 12B:
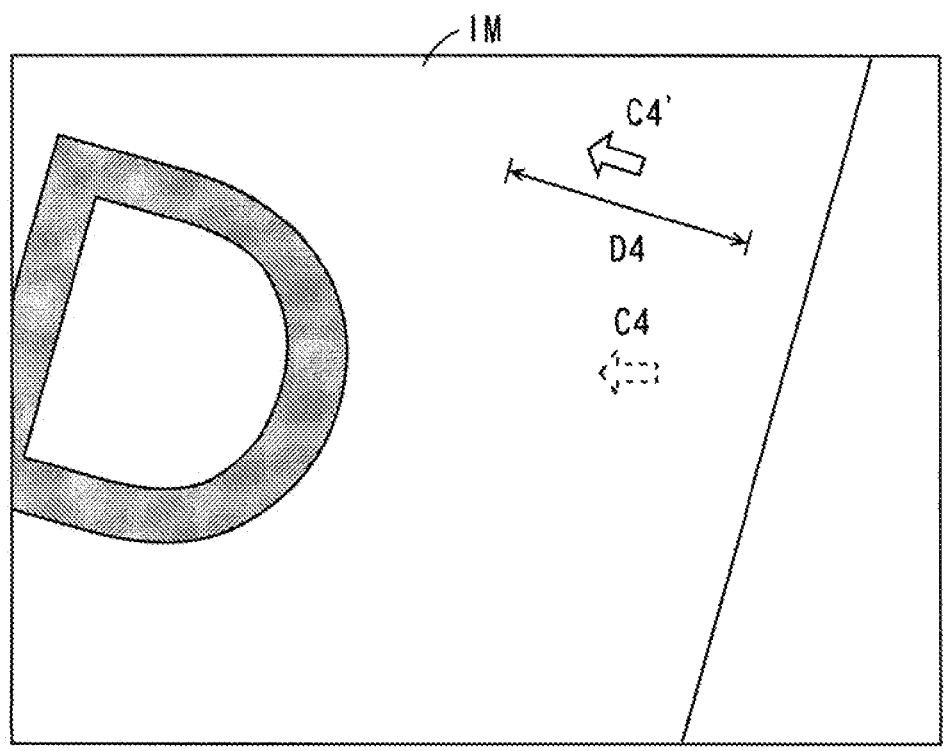

As shown in FIG. 12A, when a moving direction A4 and a moving amount B4 are provided as a movement instruction to the input unit 250, the stage 21 moves just by the moving amount B4 in the moving direction A4. In this case, as shown in FIG. 12B, the observed image IM moves just by a moving amount D4 in a direction C4' different from the direction C4.

As described above, when the $x_r$-axis and the $y_r$-axis of the imaging region IR are displaced with respect to the X-axis and the Y-axis, the moving direction of the stage 21 with respect to the X-axis and the Y-axis is different from the moving direction of the observed image IM with respect to the $x_d$-axis and the $y_d$-axis of the display part 260. For this reason, the observed image IM may move in a direction different from the desired direction. Threat, in the present embodiment, an angle of the $x_r$-axis and the $y_r$-axis of the imaging region IR with respect to the $x_t$-axis and the $y_t$-axis of the stage 21 is detected based on the moving direction of the observed image IM. Based on the detected angle, an angle of the $x_r$-axis and the $y_r$-axis of the imaging region with respect to the X-axis and the Y-axis (hereinafter, referred to as imaging region inclination angle) is calculated, and based on the calculated imaging region inclination angle, the moving direction of the stage 21 is corrected.

FIGS. 13A, 13B, 14A, and 14B are views for describing correction of the moving direction of the stage 21. Herein, examples will be described in which the moving direction of the stage 21 is corrected based on the moving direction of the observed image IM in the examples of FIGS. 11A, 11B, 12A, and 12B. The observed image IM of FIG. 13A correspond to the observed image IM of FIG. 11B, and the observed image IM of FIG. 14B corresponds to the observed image IM of FIG. 12B. Further, in the present example, with the $x_t$-axis and the $y_t$-axis of the stage 21 respectively agreeing with the X-axis and the Y-axis, the angle of the $x_r$-axis and the $y_r$-axis of the imaging region IR with respect to the $x_t$-axis and the $y_t$-axis of the stage 21 is equivalent to the imaging region inclination angle.

Figure 13A:
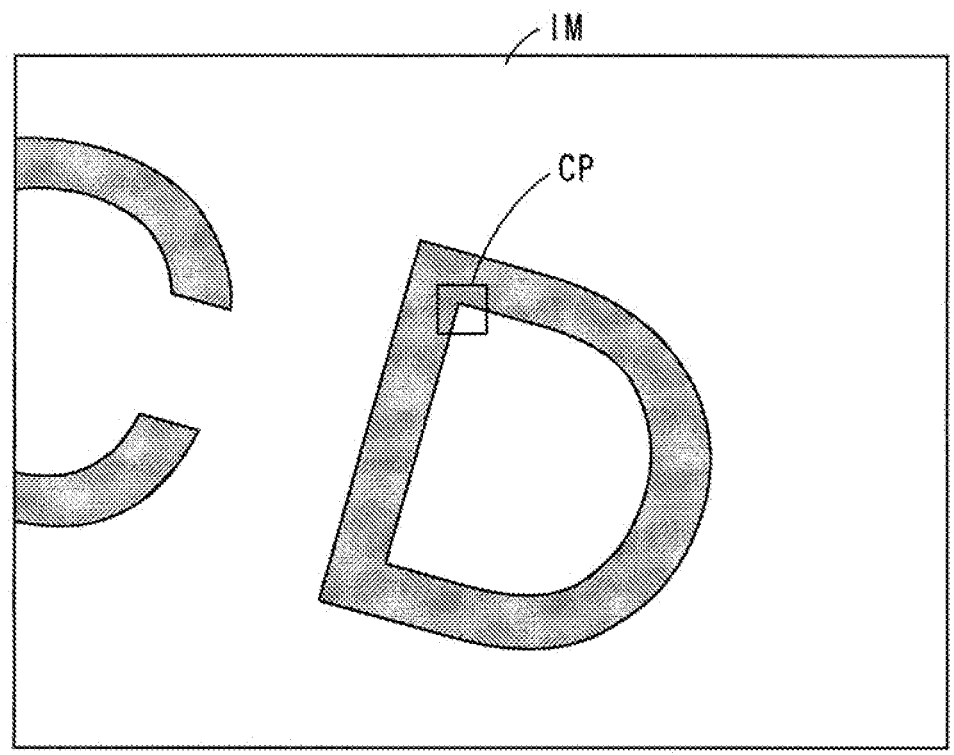
FIGS. 13A and 13B are views for describing correction of a moving direction of the stage.
Figure 13B:
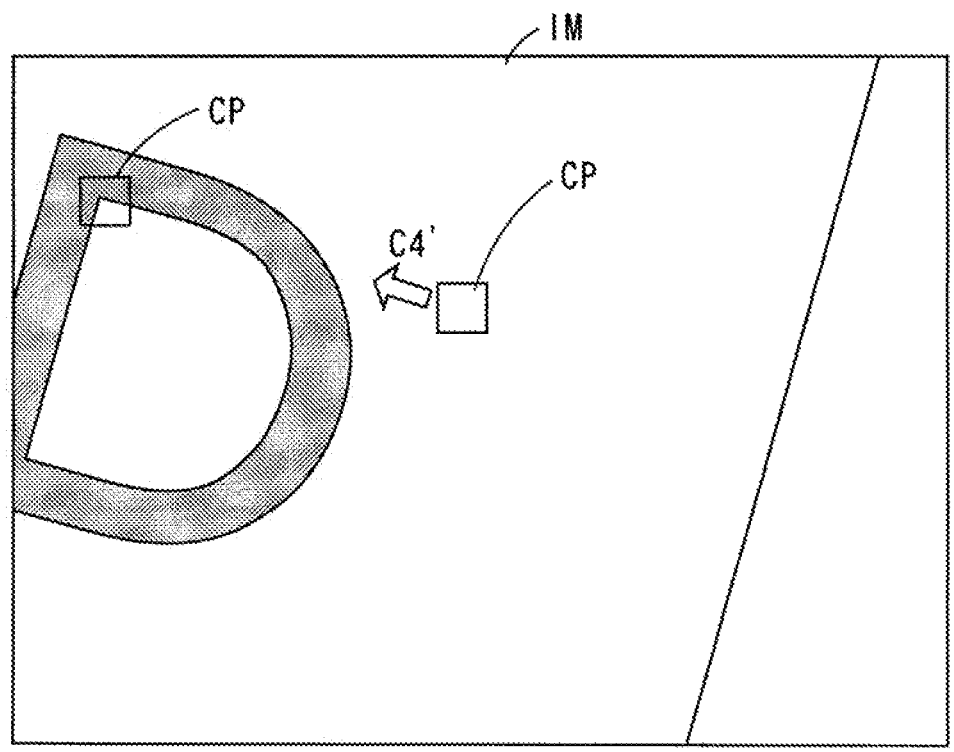

First, as shown in FIG. 13A, a feature point CP is detected from the observed image IM before movement. For example, a portion at which a change in contrast is relatively large, or the like, is detected as the feature point CP. Subsequently, the stage 21 is moved. In this case, the moving amount of the stage 21 is set in accordance with the magnification of the imaging unit 10 such that the feature point CP does not go outside the screen of the display part 260. In the present example, as described above, the stage 21 is moved just by the moving amount B4 in the moving direction A4. Subsequently, as shown in FIG. 13B, the feature point CP is detected from the observed image TM after the movement by pattern matching, for example.

Based on the position of the feature point CP in the observed image IM before the movement and the position of the feature point CP in the observed image IM after the movement, the moving direction C4' of the feature point CP is specified as the moving direction of the observed image IM. Based on the specified moving direction C4', the imaging region inclination angle θ3 (FIG. 12) is acquired.

Figure 14A:
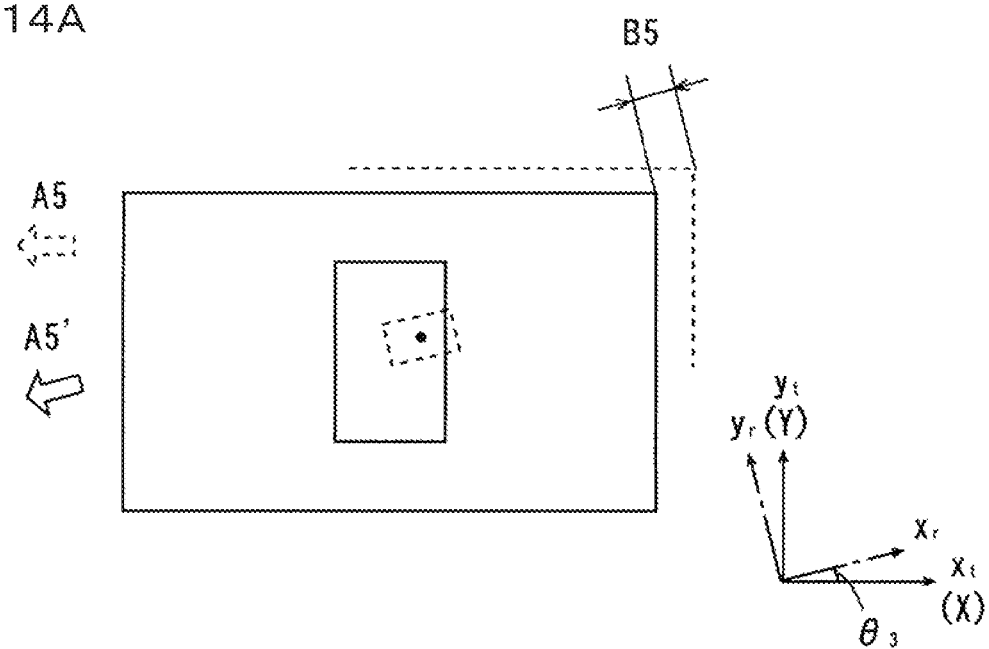
FIGS. 14A and 14B are views for describing correction of a moving direction of the stage.
Figure 14B:
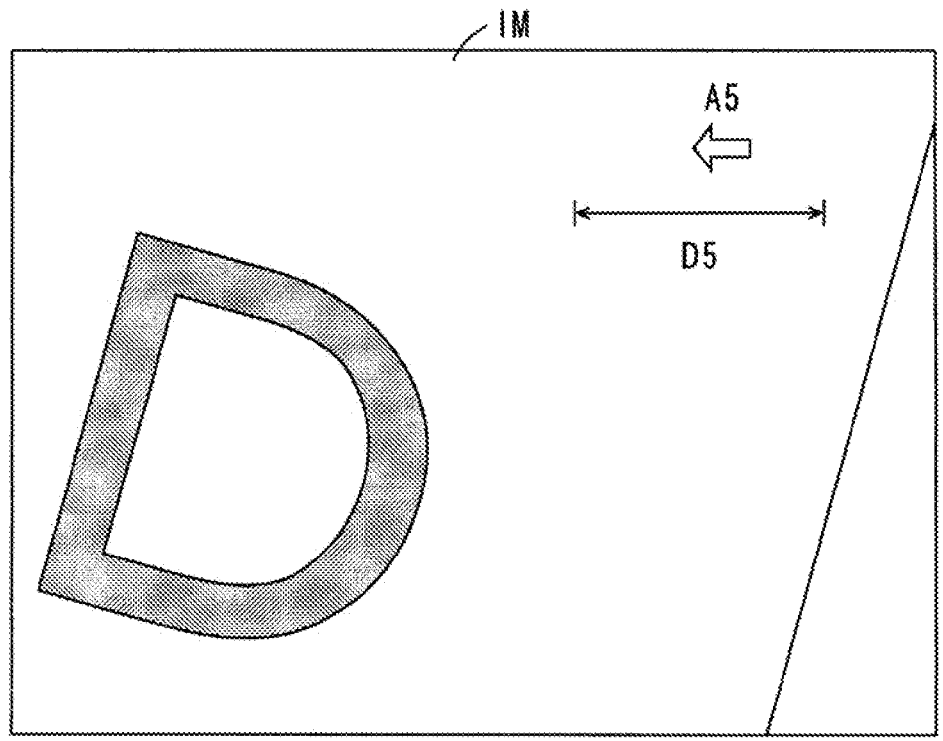

Based on the acquired imaging region inclination angle θ3, the moving direction of the stage 21 is controlled such that the observed image IM moves in the desired direction. Specifically, in the case of moving the observed image IM just by a moving amount D5 in a direction C5 as shown in FIG. 14B, the $x_t$ moving amount and the $y_t$ moving amount are calculated such that the stage 21 is moved just by a moving amount B5 in a moving direction A5' displaced just by the imaging region inclination angle θ3 from a moving direction A5, as shown in FIG. 14A. The stage 21 is moved based on the calculated $x_t$ moving amount and $y_t$ moving amount. Thereby, the observed image IM moves in the desired direction. Hence, the user can easily align a desired region of the observation object S to the imaging region IR, while viewing the observed image IM.

Figure 15:
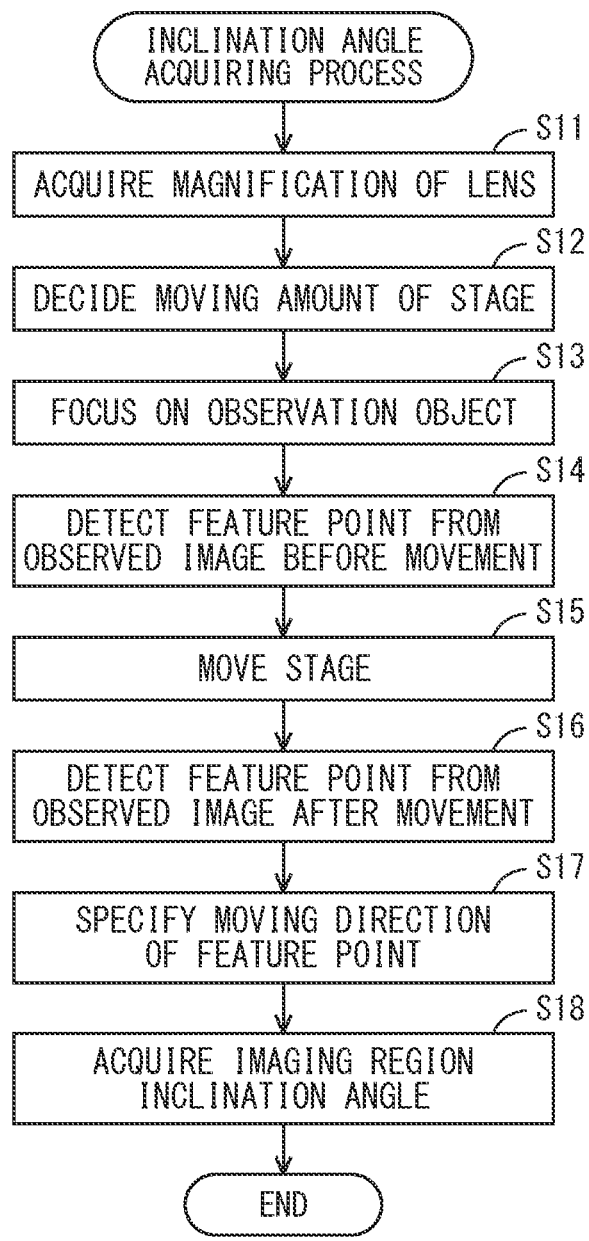
FIG. 15 is a flowchart for an inclination angle acquiring process by the CPU.

The CPU 220 of the image processing apparatus 200 performs an inclination angle acquiring process based on the control program stored in the storage unit 240, thereby realizing acquirement of the imaging region inclination angle. FIG. 15 is a flowchart for the inclination angle acquiring process by the CPU 220. The timing to perform the inclination angle acquiring process is not particularly limited. For example, the inclination angle acquiring process may be performed at the startup of the image processing apparatus 200, or the inclination angle acquiring process may be performed in accordance with an instruction by the user.

As shown in FIG. 15, first, the CPU 220 acquires a magnification of the imaging unit 10 (magnification of the object lens 13) from a magnification detecting part (not shown) (step S11). Next, the CPU 220 decides a moving amount of the stage 21 on the XY plane based on the acquired magnification of the imaging unit 10 (step 12). Subsequently, the CPU 220 moves the imaging unit 10 in the Z-direction by means of the lens driving part 17 such that the focus of the imaging unit 10 agrees with the surface of the observation object S (step S13).

Then, as shown in FIG. 13A, the CPU 220 detects a feature point CP from the observed image IM before the movement (step S14). Next, the CPU 220 moves the stage 21 just by the moving amount decided in step S12 (step S15). The moving direction of the stage 21 may be previously decided, or may be set as appropriate in accordance with a position of the detected feature point.

Subsequently, the CPU 220 detects the feature point CP, detected in step S14, from the observed image IM after the movement by pattern matching, for example (step S16). Then, the CPU 220 specifies a moving direction of the feature point CP based on the position of the feature point CP, detected in steps S14, S16 (step S17). Next, the CPU 220 acquires an imaging region inclination angle based on the calculated moving direction (step S18), and completes the process.

The acquired imaging region inclination angle is stored into the storage unit 240 or the operation memory 270. Thereafter, when a movement instruction of the stage 21 is provided to the input unit 250, the CPU 220 calculates an $x_t$ moving amount and a $y_t$ moving amount by use of the stored imaging region inclination angle such that the observed image IM moves in the desired direction.

As described above, in the present embodiment, an imaging region inclination angle is calculated based on a moving direction of the observed image IM at the time of predetermined calibration (at the time of the inclination angle acquiring process), and the moving direction of the stage 21 is corrected based on the calculated imaging region inclination angle at the normal time subsequent thereto. It is thereby possible to control movement of the stage 21 such that the observed image IM moves in the desired direction. Hence, the user can easily align a desired region of the observation object S to the imaging region IR, while viewing the observed image IM. Further, the imaging region inclination angle can be changed as appropriate in accordance with an observation purpose, user's preferences, or the like, without impairing the operability.

(5) Position Specifying Image

Figure 16:
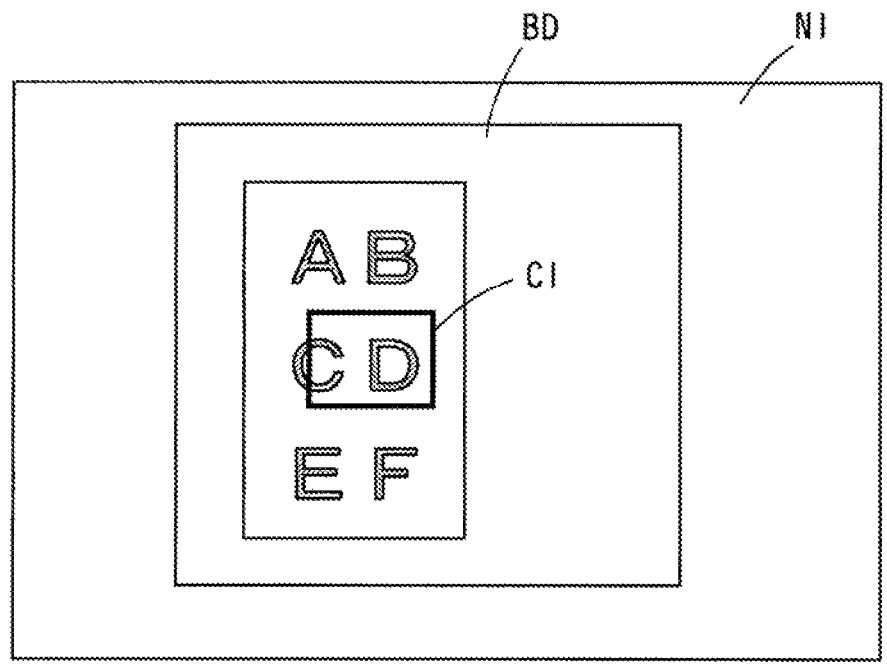
FIG. 16 is a view showing an example of a position specifying image.

In the present embodiment, a display part 160 can display a position specifying image showing a position of the imaging region IR on the stage 21. FIG. 16 is a view showing an example of the position specifying image. A position specifying image NI of FIG. 16 includes a wide-range image BD that represents a region wider than the current imaging region IR on the stage 21 and an imaging region corresponding image CI corresponding to the imaging region IR.

In the present example, the wide-range image BD is displayed based on image data acquired by the imaging unit 10. For example, the imaging object S is previously imaged by the imaging unit 10 at a lower magnification than the current magnification, to acquire wide-field image data, and a wide-range image BD is displayed based on the image data. Further, as the stage 21 is sequentially moved along the $x_t$-axis and the $y_t$-axis, image data of the imaging region IR are sequentially acquired by the imaging unit 10. A plurality of images based on the acquired plurality of pieces of image data are connected, to display the wide-range image BD.

Further, the wide-range image BD favorably corresponds to a relative movable range of the imaging region IR on the stage 21. In this case, the user can easily recognize the relative movable range of the imaging region IR on the stage 21. This allows the user to efficiently align the desired region of the observation object S to the imaging region IR.

Further, the wide-range image BD may be a diagram representing a region wider than the current imaging region IR on the stage 21. The diagram is configured by a linear line or a curve, and includes a rectangle, a circle, parentheses, and an arrow, for example. In this case, the wide-range image BD is displayed without increasing a process load on the CPU 220.

In the present example, the imaging region corresponding image CI has a rectangular shape. A position of the imaging region corresponding image CI inside the wide-range image BD corresponds to the position of the imaging region IR on the stage 21.

Figure 17:
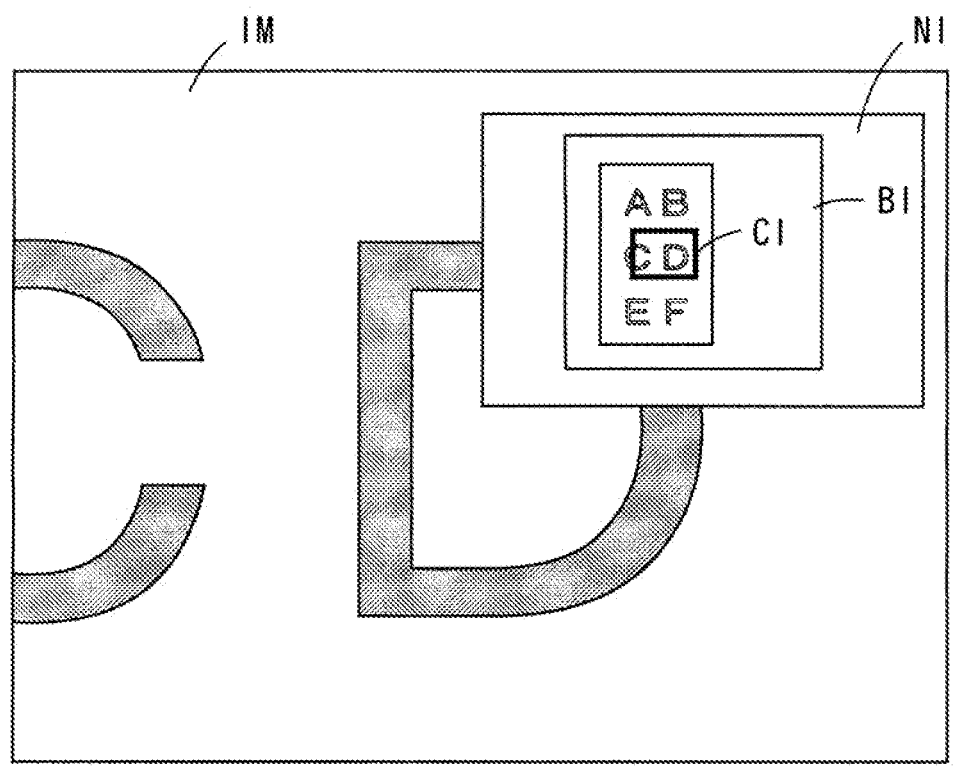
FIG. 17 is a view showing an example of display of the position specifying image by the display part.
Figure 18:
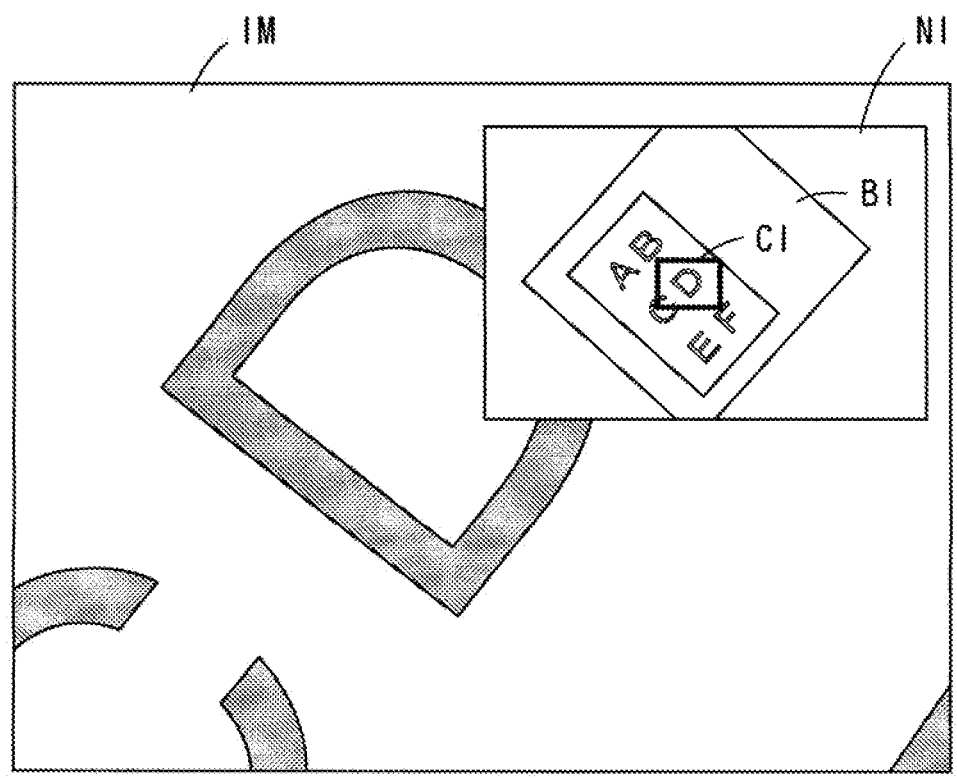
FIG. 18 is a view showing an example of display of the position specifying image by the display part.

FIGS. 17 to 19 are views showing examples of display of the position specifying image NI by the display part 260. In the example of FIG. 17, the position specifying image NI is displayed so as to overlap the observed image IM. In this case, the user can easily recognize a positional relation between the stage 21 and the imaging region IR based on the position specifying image NI. Further, when a portion to be observed of the observation object S is not displayed as the observed image IM, the user can easily recognize a direction and a moving amount in which the stage 21 is to be moved based on the position specifying image NI.

When the stage 21 is rotated in the state of FIG. 17, as shown in FIG. 18, the position specifying image NI is rotated along with rotation of the observed image IM. This allows the user to easily recognize the rotational angle of the stage 21 with respect to the imaging region IR.

In the present embodiment, the input unit 250 is configured so as to be able to accept designation of an arbitrary position in the position specifying image NI. The CPU 220 controls movement of the stage 21 by means of the stage driving part 22 such that a position on the stage 21 which corresponds to the position designated by the input unit 250 is the imaging region IR.

Figure 19A:
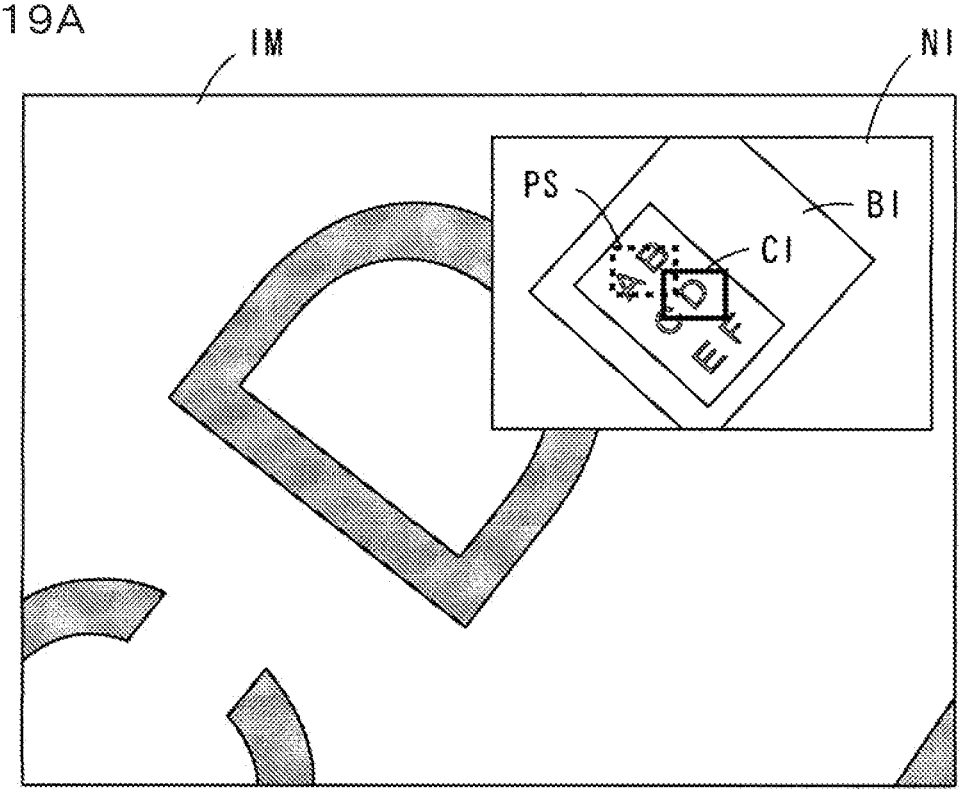
FIGS. 19A and 19B are views showing an example of display of the position specifying image by the display part.
Figure 19B:
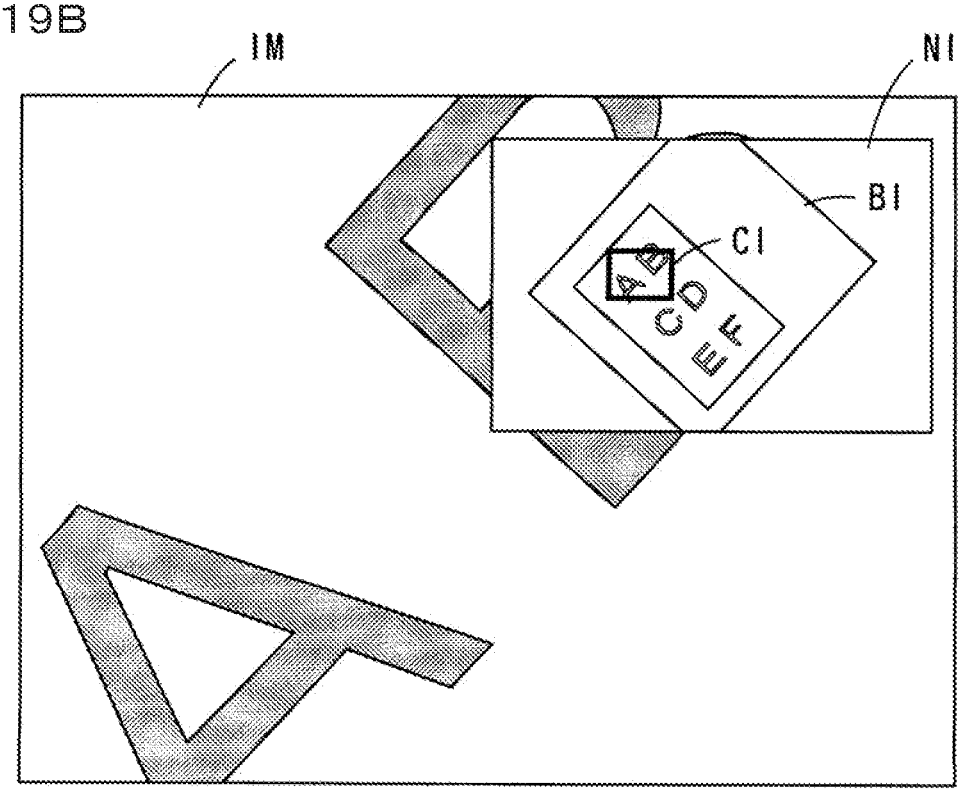

For example, in the position specifying image NI of FIG. 19A, the user operates the input unit 250 to designate a position PS. In this case, as shown in FIG. 19B, the stage 21 is moved such that a position on the stage 21 which corresponds to the position PS is the imaging region IR.

Specifically, the CPU 220 calculates an $x_t$ moving amount and a $y_t$ moving amount based on the position on the position specifying image NI designated by the input unit 250, and provides the stage driving part 22 with the $x_t$ moving amount and the $y_t$ moving amount as a movement instruction. The stage driving part 22 moves the stage 21 based on the provided movement instruction. This allows the user to efficiently align the desired region of the observation object S to the imaging region IR.

The CPU 220 may calculate a relation between a moving amount in pixel units on the position specifying image NI and an actual moving amount on the stage 21 based on the moving amount of the observed image IM in the case where the stage 21 has been moved, and may correct the $x_t$ moving amount and the $y_t$ moving amount to be provided to the stage driving part 22 based on the calculated relation.

For example, as shown in FIGS. 13A and 13B, the common feature point CP can be detected from the observed image IM before and after movement, to thereby acquire the moving amount of the feature point CP in pixel units. Hence, the relation between the moving amount in pixel units in the observed image IM and the actual moving amount on the stage 21 can be calculated. Further, the relation between the moving amount in pixel units in the observed image IM and the moving amount in pixel units in the position specifying image NI can be calculated based on the magnification of the imaging unit 10 and the magnification of the position specifying image NI. As a result, a relation between the moving amount in pixel units in the position specifying image NI and the actual moving amount on the stage 21 can be calculated. Based on the relation calculated in such a manner, the $x_t$ moving amount and the $y_t$ moving amount are corrected, to thereby improve accuracy in movement of the stage 21.

Although the stage 21 is moved by designation of the position in the position specifying image NI in the present example, this is not restrictive, and the stage 21 may be moved by designation of a desired position on the observed image IM. For example, when an arbitrary position on the observed image IM is designated, the stage 21 is moved such that a position on the stage 21 which corresponds to the designated position moves to the center of the imaging region IR.

Also in this case, similarly to the above, the CPU 220 may calculate a relation between a moving amount in pixel units in the observed image IM and an actual moving amount on the stage 21 based on the moving amount of the observed image IM in the case where the stage 21 has been moved, and may correct the $x_t$ moving amount and the $y_t$ moving amount to be provided to the stage driving part 22 based on the calculated relation.

(6) Other Embodiments

Although the rotational angle of the stage 21 is detected by the rotational angle sensor 30 in the above embodiment, this is not restrictive, and the rotational angle of the stage 21 may be detected by another method. For example, a line representing at least one of the X-axis and the Y-axis may be added to the placement surface 21a of the stage 21, and this line may be imaged by the imaging unit 10. In this case, the rotational angle of the stage 21 can be detected based on inclination of a line in the observed image IM.

Further, although the imaging region inclination angle is calculated based on the moving direction of the observed image IM and the moving direction of the stage 21 is corrected based on the calculated imaging region inclination angle in the above embodiment (cf. FIGS. 13A to 15), the moving direction of the stage 21 may be corrected by another method. For example, a direction specifying part for specifying a direction of the X-axis or the Y-axis may be provided on the placement surface 21a of the stage 21, an angle of the $x_t$-axis and the $y_t$-axis of the stage 21 with respect to the $x_r$-axis and the $y_r$-axis of the imaging region IR may be detected based on an image of the direction specifying part included in the observed image IM, and the moving direction of the stage 21 may be corrected based on the detected angle. The direction specifying part may, for example, be a line, a projection, a groove or the like which represents at least one of the X-axis and the Y-axis.

Specifically, at the time of predetermined calibration (e.g. at the startup of the image processing apparatus 200), the direction specifying part on the stage 21 is imaged, and the angle of the $x_t$-axis and the $y_t$-axis of the stage 21 with respect to the $x_r$-axis and the $y_r$-axis of the imaging region IR may be detected based on the direction shown by the direction specifying part in the observed image IM. This leads to detection of a relative angle between the imaging region IR and the stage 21 in an initial state. At the normal time subsequent thereto, the moving direction of the stage 21 can be corrected such that the observed image IM moves in the desired direction by means of the detected angle in a manner similar to the above example.

Further, although the moving direction and the moving amount of the stage 21 are provided as the movement instruction in the above embodiment, this is not restrictive, and a moving direction and a moving amount of the imaging region IR being relative with respect to the stage 21 may be provided. In this case, for example, the moving direction and the moving amount of the imaging region IR are converted to a moving direction and a moving amount of the stage 21, and an $x_t$ moving amount and a $y_t$ moving amount are calculated based on the converted moving direction and moving amount in a manner similar to the above.

Further, although the stage driving part 22 rotates the stage 21 based on the rotation command signal from the CPU 220 in the above embodiment, this is not restrictive, and the stage 21 may be manually rotated.

(7) Corresponding Relation Between Each Constitutional Element of Claims and Each Part of Embodiment Although an example of correspondence between each constitutional element of the claims and each part of the embodiment will be hereinafter described, the present invention is not limited to the following example.

In the above embodiment, the imaging unit 10 is an example of the imaging part, the display part 260 is an example of the display part, the stage 21 is an example of the stage, the placement surface 21a is an example of the placement surface, the rotational angle sensor 30 is an example of the rotational angle detecting part, the stage driving part 22 is an example of the stage driving part, the input unit 250 is an example of the instruction accepting part, and the CPU 220 is an example of the control part.

Further, the supporting part 7 is an example of the supporting part, the wide-range image BD is an example of the first image, the imaging region corresponding image CI is an example of the second image, the $x_t$-axis and the $y_t$-axis are examples of the first and second axes, the $x_r$-axis and the $y_r$-axis are examples of the third and fourth axes, and the X-axis and the Y-axis are examples of the fifth and sixth axes.

As each constitutional element of the claims, a variety of other elements having the configuration or the function described in the claims can be employed.

The present invention is available for a variety of magnification observation devices.

What is claimed is:

1. A magnification observation device, comprising:
an imaging part that images an observation object, to acquire imaging data of an imaging region;
a display part that displays an image of the observation object as an observed image based on the image data acquired by the imaging part;
a stage that has a placement surface on which the observation object is placed, and is provided relatively rotatably with respect to the imaging part around a rotational axis substantially vertical to the placement surface, and movably along first and second axes intersecting with each other within a plane substantially parallel to the placement surface;
a rotational angle detecting part that detects a rotational angle of the stage;
a stage driving part that moves the stage relatively with respect to the imaging part along the first and second axes;
an instruction accepting part that accepts an instruction for a moving direction of the stage;
a control part that provides the stage driving part with moving amounts of the stage along the first and second axes, to control movement of the stage, wherein
the first and second axes of the stage rotate around the rotational axis integrally with the stage, and
the control part is configured to control the moving amounts along the first and second axes to be provided to the stage driving part such that a moving direction of the observation object in the imaging region of the imaging part agrees with the direction accepted by the instruction accepting part, based on the rotational angle detected by the rotational angle detecting part, and wherein the imaging region of the imaging part is provided with third and fourth axes intersecting with each other, and the control part is configured to detect an angle difference between the first and second axes of the stage and the third and fourth axes of the imaging region during predetermined calibration, and the moving amounts of the stage along the first and second axes to be provided to the stage driving part is corrected based on the detected angle difference in normal time.

2. The magnification observation device according to claim 1, wherein the control part is configured to detect the angle difference between the first and second axes of the stage and the third and fourth axes of the imaging region based on the moving direction of the observed image in a case where the stage has been moved by the stage driving part.

3. The magnification observation device according to claim 1, wherein
a direction specifying part for specifying directions of the first and second axes is provided on the stage, and
the control part is configured to detect the angle difference between the first and second axes of the stage and the third and fourth axes of the imaging region based on an image of the direction specifying part included in the observed image.

4. The magnification observation device according to claim 1, wherein the display part displays a position specifying image indicating a position of the imaging region on the stage.

5. The magnification observation device according to claim 4, wherein
the position specifying image includes a first image representing a region wider than the imaging region on the stage and a second image corresponding to the imaging region, and
the control part rotates the first image relatively with respect to the second image based on the rotational angle detected by the rotational angle detecting part.

6. The magnification observation device according to claim 5, wherein
the imaging part is configured to be capable of imaging the region wider than the imaging region, and the display part displays the first image based on image data obtained upon imaging the wide region by the imaging part.

7. The magnification observation device according to claim 5, wherein the first image shows a diagram for specifying the region wider than the imaging region on the stage.

8. The magnification observation device according to claim 5, wherein the first image corresponds to a relatively movable range of the imaging region on the stage.

9. The magnification observation device according to claim 4, wherein
the instruction accepting part is configured to be capable of accepting designation of an arbitrary position in the position specifying image, and
the control part controls movement of the stage by the stage driving part such that the imaging region moves to a position on the stage which corresponds to the position designated by the instruction accepting part.

10. The magnification observation device according to claim 1, wherein the control part is configured to detect a moving amount of the observed image in the case where the stage has been moved, calculate a relation between the moving amount of the observed image and the moving amount of the stage based on the detected moving amount, and correct the moving amount to be provided to the stage driving part based on the calculated relation.

* * * * *